US007475149B2

(12) United States Patent
Jacob et al.

(10) Patent No.: US 7,475,149 B2
(45) Date of Patent: *Jan. 6, 2009

(54) APPARATUS AND METHOD FOR SPECIFYING AND OBTAINING SERVICES THROUGH AN AUDIO TRANSMISSION MEDIUM

(75) Inventors: Karl Jacob, San Francisco, CA (US); Scott Faber, San Francisco, CA (US); Sean Van der Linden, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 353 days.

This patent is subject to a terminal disclaimer.

(21) Appl. No.: 10/015,968

(22) Filed: Dec. 6, 2001

(65) Prior Publication Data

US 2002/0133571 A1    Sep. 19, 2002

Related U.S. Application Data

(63) Continuation-in-part of application No. 09/702,217, filed on Oct. 30, 2000, now Pat. No. 6,636,590.

(51) Int. Cl.
*G06F 15/16* (2006.01)
(52) U.S. Cl. ..................... 709/228; 709/218
(58) Field of Classification Search .............. 379/15.02, 379/88.01, 88.17, 92.01, 93.25, 93.28, 114.01, 379/265.12; 709/219, 227, 218, 228; 707/3
See application file for complete search history.

(56) References Cited

U.S. PATENT DOCUMENTS

| 4,313,035 | A | 1/1982 | Jordan et al. |
| 4,577,065 | A | 3/1986 | Frey et al. |
| 4,604,686 | A * | 8/1986 | Reiter et al. ......... 707/E17.006 |

(Continued)

FOREIGN PATENT DOCUMENTS

AU    699 785    12/1995

(Continued)

OTHER PUBLICATIONS

Keen.com Feb. 4, 2006.*

(Continued)

*Primary Examiner*—Patrice Winder
*Assistant Examiner*—Ajay Bhatia
(74) *Attorney, Agent, or Firm*—John P. Ward; Greenberg Traurig, LLP

(57) ABSTRACT

The present invention provides a method and apparatus for specifying and obtaining services through audio commands, resulting in a live conversation between a user and a selected service provider using an audio-transmission medium (the telephone). A service seeker locates a service provider by entering a keypad code corresponding to a field of service or by speaking the name of a profession, which is recognized by the system. The seeker can then specify, via voice or keypad entry, a price range, quality rating, language, and keyword descriptors of the service provider, such as a service provider code number. In response, the system offers currently available service providers. Once an available service provider is selected, the system connects the service seeker with the service provider for a live conversation. The system bills the seeker for the time spent conversing with the service provider and compensates the service provider accordingly.

26 Claims, 10 Drawing Sheets

U.S. PATENT DOCUMENTS

| | | | |
|---|---|---|---|
| 4,631,428 A | 12/1986 | Grimes | |
| 4,645,873 A | 2/1987 | Chomet | |
| 4,677,434 A | 6/1987 | Fascenda | |
| 4,677,659 A * | 6/1987 | Dargan | 379/93.27 |
| 4,723,283 A | 2/1988 | Nagasawa et al. | |
| 4,741,025 A | 4/1988 | Maruyama et al. | |
| 4,751,669 A | 6/1988 | Sturgis et al. | |
| 4,752,675 A | 6/1988 | Zetmeir | |
| 4,757,267 A * | 7/1988 | Riskin | 379/114.24 |
| 4,796,293 A | 1/1989 | Blinken et al. | |
| 4,817,129 A * | 3/1989 | Riskin | 379/88.24 |
| 4,847,890 A * | 7/1989 | Solomon et al. | 379/88.21 |
| 4,850,007 A | 7/1989 | Marino et al. | |
| 4,878,239 A | 10/1989 | Solomon et al. | |
| 4,963,995 A | 10/1990 | Lang | |
| 4,969,185 A | 11/1990 | Dorst et al. | |
| 5,018,917 A | 5/1991 | Fisher et al. | |
| 5,057,932 A | 10/1991 | Lang | |
| 5,058,152 A | 10/1991 | Solomon et al. | |
| 5,099,510 A | 3/1992 | Blinken, Jr. et al. | |
| 5,148,474 A | 9/1992 | Haralambopoulos et al. | |
| 5,155,743 A | 10/1992 | Jacobs | |
| 5,155,761 A | 10/1992 | Hammond | |
| 5,164,839 A | 11/1992 | Lang | |
| 5,182,769 A | 1/1993 | Graber et al. | |
| 5,206,903 A | 4/1993 | Kohler et al. | |
| 5,262,875 A | 11/1993 | Mincer et al. | |
| 5,290,197 A | 3/1994 | Lederman | |
| 5,319,542 A * | 6/1994 | King et al. | 705/27 |
| 5,325,424 A | 6/1994 | Grube | |
| 5,339,358 A * | 8/1994 | Danish et al. | 379/368 |
| 5,347,632 A | 9/1994 | Filepp et al. | |
| 5,359,508 A * | 10/1994 | Rossides | 705/30 |
| 5,361,295 A | 11/1994 | Solomon et al. | |
| 5,369,694 A | 11/1994 | Bales et al. | |
| 5,373,549 A | 12/1994 | Bales et al. | |
| 5,436,957 A | 7/1995 | McConnell | |
| 5,440,334 A | 8/1995 | Walters et al. | |
| 5,448,625 A | 9/1995 | Lederman | |
| 5,453,352 A | 9/1995 | Tachibana | |
| 5,459,779 A | 10/1995 | Backaus et al. | |
| 5,469,497 A | 11/1995 | Pierce et al. | |
| 5,483,352 A | 1/1996 | Fukuyama et al. | |
| 5,483,588 A | 1/1996 | Eaton et al. | |
| 5,497,502 A | 3/1996 | Castille | |
| 5,524,146 A | 6/1996 | Morrisey et al. | |
| 5,537,314 A | 7/1996 | Kanter | |
| 5,539,735 A | 7/1996 | Moskowitz | |
| 5,539,813 A | 7/1996 | Jonsson | |
| 5,544,237 A | 8/1996 | Bales et al. | |
| 5,555,298 A | 9/1996 | Jonsson | |
| 5,557,677 A | 9/1996 | Prytz | |
| 5,559,875 A | 9/1996 | Bieselin et al. | |
| 5,574,780 A * | 11/1996 | Andruska et al. | 379/221.09 |
| 5,574,781 A | 11/1996 | Blaze | |
| 5,589,892 A | 12/1996 | Knee et al. | |
| 5,590,197 A | 12/1996 | Chen et al. | |
| 5,596,634 A * | 1/1997 | Fernandez et al. | 379/210.01 |
| 5,602,905 A * | 2/1997 | Mettke | 379/93.22 |
| 5,604,803 A | 2/1997 | Aziz | |
| 5,608,786 A | 3/1997 | Gordon | |
| 5,615,213 A * | 3/1997 | Griefer | 370/412 |
| 5,619,148 A | 4/1997 | Guo | |
| 5,619,555 A | 4/1997 | Fenton et al. | |
| 5,619,570 A | 4/1997 | Tsutsui | |
| 5,619,725 A | 4/1997 | Gordon | |
| 5,619,991 A | 4/1997 | Sloane | |
| 5,623,536 A | 4/1997 | Solomon et al. | |
| 5,634,012 A | 5/1997 | Stefik et al. | |
| 5,638,432 A | 6/1997 | Wille et al. | |
| 5,644,715 A | 7/1997 | Baugher | |
| 5,651,058 A | 7/1997 | Hackett-Jones et al. | |
| 5,659,742 A * | 8/1997 | Beattie et al. | 707/3 |
| 5,668,953 A | 9/1997 | Sloo | |
| 5,675,734 A | 10/1997 | Hair | |
| 5,689,553 A | 11/1997 | Ahuja et al. | |
| 5,694,163 A | 12/1997 | Harrison | |
| 5,694,537 A | 12/1997 | Montenegro et al. | |
| 5,694,549 A * | 12/1997 | Carlin et al. | 709/250 |
| 5,701,419 A | 12/1997 | McConnell | |
| 5,710,887 A | 1/1998 | Chelliah et al. | |
| 5,710,970 A | 1/1998 | Walters et al. | |
| 5,712,979 A | 1/1998 | Graber et al. | |
| 5,715,314 A | 2/1998 | Payne et al. | |
| 5,717,860 A | 2/1998 | Graber et al. | |
| 5,718,247 A | 2/1998 | Frankel | |
| 5,721,763 A | 2/1998 | Joseph et al. | |
| 5,722,418 A | 3/1998 | Bro | |
| 5,724,424 A | 3/1998 | Gifford | |
| 5,724,521 A | 3/1998 | Dedrick | |
| 5,734,961 A | 3/1998 | Castille | |
| 5,740,231 A | 4/1998 | Cohn et al. | |
| 5,740,549 A | 4/1998 | Reilly et al. | |
| 5,745,681 A | 4/1998 | Levine et al. | |
| 5,751,956 A | 5/1998 | Kirsch | |
| 5,768,348 A | 6/1998 | Solomon et al. | |
| 5,768,521 A | 6/1998 | Dedrick | |
| 5,774,534 A | 6/1998 | Mayer | |
| 5,778,367 A | 7/1998 | Wesinger, Jr. et al. | |
| 5,781,894 A | 7/1998 | Petrecca et al. | |
| 5,794,210 A | 8/1998 | Goldhaber et al. | |
| 5,794,221 A | 8/1998 | Egendorf | |
| 5,802,502 A | 9/1998 | Gell et al. | |
| 5,809,119 A | 9/1998 | Tonomura et al. | |
| 5,809,145 A | 9/1998 | Slik et al. | |
| 5,812,769 A | 9/1998 | Graber et al. | |
| 5,818,836 A | 10/1998 | DuVal | |
| 5,819,092 A * | 10/1998 | Ferguson et al. | 717/113 |
| 5,819,267 A | 10/1998 | Uyama | |
| 5,819,271 A | 10/1998 | Mahoney et al. | |
| 5,819,285 A | 10/1998 | Damico et al. | |
| 5,825,869 A | 10/1998 | Brooks et al. | |
| 5,825,876 A | 10/1998 | Peterson, Jr. | |
| 5,832,523 A | 11/1998 | Kanai et al. | |
| 5,835,896 A | 11/1998 | Fisher et al. | |
| 5,841,763 A | 11/1998 | Leondires et al. | |
| 5,842,212 A | 11/1998 | Ballurio et al. | |
| 5,845,265 A | 12/1998 | Woolston | |
| 5,850,433 A * | 12/1998 | Rondeau | 379/218.01 |
| 5,860,068 A | 1/1999 | Cook | |
| 5,862,223 A * | 1/1999 | Walker et al. | 705/50 |
| 5,864,871 A | 1/1999 | Kitain et al. | |
| 5,870,546 A | 2/1999 | Kirsch | |
| 5,870,744 A | 2/1999 | Sprague | |
| 5,878,130 A | 3/1999 | Andrews et al. | |
| 5,884,032 A * | 3/1999 | Bateman et al. | 709/204 |
| 5,884,272 A | 3/1999 | Walker et al. | |
| 5,884,282 A | 3/1999 | Robinson | |
| 5,889,774 A | 3/1999 | Mirashrafi et al. | |
| 5,890,138 A | 3/1999 | Godin et al. | |
| 5,893,077 A | 4/1999 | Griffin | |
| 5,901,214 A * | 5/1999 | Shaffer et al. | 379/211.02 |
| 5,903,635 A | 5/1999 | Kaplan | |
| 5,903,877 A | 5/1999 | Berkowitz et al. | |
| 5,907,677 A | 5/1999 | Glenn et al. | |
| 5,911,132 A | 6/1999 | Sloane | |
| 5,914,951 A * | 6/1999 | Bentley et al. | 370/352 |
| 5,915,214 A | 6/1999 | Reece et al. | |
| 5,924,082 A | 7/1999 | Silverman et al. | |
| 5,937,390 A | 8/1999 | Hyodo | |
| 5,940,471 A | 8/1999 | Homayoun | |
| 5,940,484 A | 8/1999 | DeFazio et al. | |
| 5,943,416 A * | 8/1999 | Gisby | 379/265.13 |
| 5,943,422 A | 8/1999 | Van Wie et al. | |

| Patent No. | Kind | Date | Assignee |
|---|---|---|---|
| 5,946,646 | A | 8/1999 | Schena et al. |
| 5,948,054 | A | 9/1999 | Nielsen |
| 5,960,416 | A * | 9/1999 | Block .................... 705/34 |
| 5,963,202 | A | 10/1999 | Polish |
| 5,963,861 | A | 10/1999 | Hanson |
| 5,974,141 | A | 10/1999 | Saito |
| 5,974,398 | A | 10/1999 | Hanson et al. |
| 5,978,567 | A | 11/1999 | Rebane et al. |
| 5,982,863 | A * | 11/1999 | Smiley et al. ........... 379/88.18 |
| 5,987,102 | A | 11/1999 | Elliott et al. |
| 5,987,118 | A | 11/1999 | Dickerman et al. |
| 5,987,430 | A | 11/1999 | Van Horne et al. |
| 5,991,394 | A | 11/1999 | Dezonno et al. |
| 5,995,705 | A | 11/1999 | Lang |
| 5,999,609 | A | 12/1999 | Nishimura |
| 5,999,611 | A | 12/1999 | Tatchell et al. |
| 5,999,965 | A | 12/1999 | Kelly |
| 6,006,197 | A | 12/1999 | d'Eon et al. |
| 6,011,794 | A | 1/2000 | Mordowitz et al. |
| 6,014,439 | A | 1/2000 | Walker et al. |
| 6,014,644 | A | 1/2000 | Erickson |
| 6,016,478 | A | 1/2000 | Zhang et al. |
| 6,026,087 | A | 2/2000 | Mirashrafi et al. |
| 6,026,148 | A | 2/2000 | Dworkin et al. |
| 6,026,400 | A | 2/2000 | Suzuki |
| 6,028,601 | A * | 2/2000 | Machiraju et al. .............. 707/5 |
| 6,029,141 | A | 2/2000 | Bezos et al. |
| 6,035,021 | A | 3/2000 | Katz |
| 6,046,762 | A | 4/2000 | Sonesh et al. |
| 6,055,513 | A * | 4/2000 | Katz et al. .................... 705/26 |
| 6,058,379 | A | 5/2000 | Odom et al. |
| 6,064,978 | A | 5/2000 | Gardner et al. |
| 6,067,561 | A | 5/2000 | Dillon |
| 6,078,866 | A | 6/2000 | Buck et al. |
| 6,108,493 | A * | 8/2000 | Miller et al. ................ 709/219 |
| 6,108,704 | A | 8/2000 | Hutton et al. |
| 6,130,933 | A | 10/2000 | Miloslavsky |
| 6,131,085 | A | 10/2000 | Rossides |
| 6,144,670 | A | 11/2000 | Sponaugle et al. |
| 6,167,379 | A | 12/2000 | Dean et al. |
| 6,167,449 | A | 12/2000 | Arnold et al. |
| 6,173,279 | B1 * | 1/2001 | Levin et al. ................... 707/5 |
| 6,175,619 | B1 | 1/2001 | DeSimone |
| 6,185,194 | B1 | 2/2001 | Musk et al. |
| 6,185,289 | B1 | 2/2001 | Hetz et al. |
| 6,188,673 | B1 | 2/2001 | Bauer et al. |
| 6,188,761 | B1 | 2/2001 | Dickerman et al. |
| 6,189,030 | B1 | 2/2001 | Kirsch et al. |
| 6,192,050 | B1 | 2/2001 | Stovall |
| 6,199,096 | B1 | 3/2001 | Mirashrafi et al. |
| 6,212,192 | B1 | 4/2001 | Mirashrafi et al. |
| 6,212,268 | B1 | 4/2001 | Nielsen |
| 6,216,111 | B1 | 4/2001 | Walker et al. |
| 6,223,165 | B1 | 4/2001 | Lauffer |
| 6,230,287 | B1 | 5/2001 | Pinard et al. |
| 6,233,566 | B1 | 5/2001 | Levine et al. |
| 6,243,684 | B1 | 6/2001 | Stuart et al. |
| 6,246,875 | B1 | 6/2001 | Seazholtz et al. |
| 6,248,946 | B1 | 6/2001 | Dwek |
| 6,259,774 | B1 | 7/2001 | Miloslavsky |
| 6,266,651 | B1 | 7/2001 | Woolston |
| 6,269,336 | B1 | 7/2001 | Ladd et al. |
| 6,269,361 | B1 | 7/2001 | Davis et al. |
| 6,275,490 | B1 | 8/2001 | Mattaway et al. |
| 6,282,515 | B1 | 8/2001 | Speicher |
| 6,292,799 | B1 * | 9/2001 | Peek et al. ................ 379/88.02 |
| 6,298,056 | B1 | 10/2001 | Pendse |
| 6,301,342 | B1 | 10/2001 | Ander et al. |
| 6,301,350 | B1 | 10/2001 | Henningson et al. |
| 6,304,637 | B1 | 10/2001 | Mirashrafi et al. |
| 6,310,941 | B1 | 10/2001 | Crutcher et al. |
| 6,311,231 | B1 | 10/2001 | Bateman et al. |
| 6,314,402 | B1 | 11/2001 | Monaco et al. |
| 6,314,454 | B1 | 11/2001 | Wang et al. |
| 6,323,894 | B1 | 11/2001 | Katz |
| 6,327,572 | B1 | 12/2001 | Morton et al. |
| 6,353,663 | B1 | 3/2002 | Stevens et al. |
| 6,381,325 | B1 * | 4/2002 | Hanson .................. 379/218.01 |
| 6,385,583 | B1 | 5/2002 | Ladd et al. |
| 6,389,278 | B1 | 5/2002 | Singh |
| 6,389,541 | B1 | 5/2002 | Wie et al. |
| 6,393,117 | B1 | 5/2002 | Trell |
| 6,393,412 | B1 | 5/2002 | Deep |
| 6,400,806 | B1 | 6/2002 | Uppaluru |
| 6,404,864 | B1 * | 6/2002 | Evslin et al. ............ 379/112.01 |
| 6,404,877 | B1 * | 6/2002 | Bolduc et al. ........... 379/218.01 |
| 6,404,884 | B1 * | 6/2002 | Marwell et al. ............. 379/223 |
| 6,408,278 | B1 | 6/2002 | Carney et al. |
| 6,430,276 | B1 | 8/2002 | Bouvier et al. |
| 6,434,527 | B1 | 8/2002 | Horvitz |
| 6,461,162 | B1 * | 10/2002 | Reitman et al. .............. 434/247 |
| 6,463,136 | B1 | 10/2002 | Malik |
| 6,466,966 | B1 | 10/2002 | Kirsch et al. |
| 6,470,079 | B1 | 10/2002 | Benson |
| 6,470,181 | B1 | 10/2002 | Maxwell |
| 6,470,317 | B1 | 10/2002 | Ladd et al. |
| 6,470,338 | B1 | 10/2002 | Rizzo et al. |
| 6,477,246 | B1 | 11/2002 | Dolan et al. |
| 6,484,148 | B1 | 11/2002 | Boyd |
| 6,493,437 | B1 | 12/2002 | Olshansky |
| 6,493,671 | B1 | 12/2002 | Ladd et al. |
| 6,493,673 | B1 | 12/2002 | Ladd et al. |
| 6,504,920 | B1 * | 1/2003 | Okon et al. ............ 379/121.01 |
| 6,510,417 | B1 * | 1/2003 | Woods et al. ............... 704/275 |
| 6,510,434 | B1 | 1/2003 | Anderson et al. |
| 6,513,013 | B1 * | 1/2003 | Stephanou ...................... 705/9 |
| 6,519,570 | B1 | 2/2003 | Faber et al. |
| 6,523,010 | B2 | 2/2003 | Lauffer |
| 6,529,878 | B2 | 3/2003 | De Rafael et al. |
| 6,535,506 | B1 | 3/2003 | Narain et al. |
| 6,539,359 | B1 | 3/2003 | Ladd et al. |
| 6,542,732 | B1 | 4/2003 | Khazaka et al. |
| 6,546,372 | B2 | 4/2003 | Lauffer |
| 6,549,889 | B2 | 4/2003 | Lauffer |
| 6,560,576 | B1 | 5/2003 | Cohen et al. |
| 6,563,915 | B1 | 5/2003 | Salimando |
| 6,606,376 | B1 | 8/2003 | Trell |
| 6,609,106 | B1 | 8/2003 | Robertson |
| 6,611,501 | B1 | 8/2003 | Owen et al. |
| 6,625,595 | B1 * | 9/2003 | Anderson et al. ......... 379/88.17 |
| 6,636,590 | B1 * | 10/2003 | Jacob et al. ............. 379/114.05 |
| 6,658,389 | B1 * | 12/2003 | Alpdemir .................... 704/275 |
| 6,668,286 | B2 | 12/2003 | Bateman et al. |
| 6,691,093 | B2 * | 2/2004 | Shell ........................... 705/26 |
| 6,704,403 | B2 | 3/2004 | Lurie et al. |
| 6,731,625 | B1 | 5/2004 | Eastep et al. |
| 6,732,183 | B1 | 5/2004 | Graham |
| 6,741,691 | B1 | 5/2004 | Ritter et al. |
| 6,757,364 | B2 * | 6/2004 | Newkirk .................. 379/88.16 |
| 6,769,020 | B2 | 7/2004 | Miyazaki et al. |
| 6,771,760 | B1 | 8/2004 | Vortman et al. |
| 6,775,359 | B1 | 8/2004 | Ron et al. |
| 6,798,753 | B1 | 9/2004 | Doganata et al. |
| 6,801,899 | B2 | 10/2004 | Lauffer |
| 6,807,532 | B1 | 10/2004 | Kolls |
| 6,807,571 | B2 * | 10/2004 | Hatano et al. ............... 709/219 |
| 6,813,346 | B2 | 11/2004 | Gruchala et al. |
| 6,836,225 | B2 * | 12/2004 | Lee et al. ....................... 707/1 |
| 6,839,737 | B1 | 1/2005 | Friskel |
| 6,850,965 | B2 | 2/2005 | Allen |
| 6,859,833 | B2 | 2/2005 | Kirsch et al. |
| 6,865,540 | B1 | 3/2005 | Faber et al. |
| 6,898,435 | B2 | 5/2005 | Milman |
| 6,910,159 | B2 | 6/2005 | Phillips et al. |
| 6,968,174 | B1 | 11/2005 | Trandal et al. |
| 6,990,183 | B2 | 1/2006 | Holland et al. |

| Patent/Publication | Date | Name |
|---|---|---|
| 7,013,280 B2 * | 3/2006 | Davis et al. .................... 707/4 |
| 7,028,012 B2 | 4/2006 | St. Vrain |
| 7,031,697 B2 | 4/2006 | Yang et al. |
| 7,032,030 B1 | 4/2006 | Condignotto |
| 7,035,381 B2 | 4/2006 | D'Ascenzo et al. |
| 7,046,782 B2 | 5/2006 | Miller |
| 7,103,010 B2 | 9/2006 | Melideo |
| 7,212,615 B2 | 5/2007 | Wolmuth |
| 7,224,781 B2 | 5/2007 | Jacob et al. |
| 7,249,045 B2 | 7/2007 | Lauffer |
| 2001/0010043 A1 | 7/2001 | Lauffer |
| 2001/0012357 A1 | 8/2001 | Mirashrafi et al. |
| 2001/0012913 A1 | 8/2001 | Iliff |
| 2001/0016826 A1 | 8/2001 | Lauffer |
| 2001/0018662 A1 | 8/2001 | Lauffer |
| 2001/0025274 A1 | 9/2001 | Zehr et al. |
| 2001/0026609 A1 | 10/2001 | Weinstein et al. |
| 2001/0027481 A1 | 10/2001 | Whyel |
| 2001/0029322 A1 | 10/2001 | Iliff |
| 2001/0029482 A1 | 10/2001 | Tealdi et al. |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0044751 A1 | 11/2001 | Pugliese |
| 2001/0048737 A1 | 12/2001 | Goldberg et al. |
| 2002/0003867 A1 * | 1/2002 | Rothschild et al. ....... 379/88.01 |
| 2002/0010608 A1 | 1/2002 | Faber et al. |
| 2002/0010616 A1 | 1/2002 | Itzhaki |
| 2002/0019846 A1 | 2/2002 | Miloslavsky et al. |
| 2002/0024948 A1 | 2/2002 | Pendse |
| 2002/0026457 A1 | 2/2002 | Jensen |
| 2002/0029241 A1 | 3/2002 | Yokono et al. |
| 2002/0038233 A1 | 3/2002 | Shubov et al. |
| 2002/0038293 A1 | 3/2002 | Seiden |
| 2002/0042826 A1 | 4/2002 | Gaus et al. |
| 2002/0044640 A1 | 4/2002 | Meek et al. |
| 2002/0057776 A1 | 5/2002 | Dyer |
| 2002/0059082 A1 | 5/2002 | Moczygemba |
| 2002/0065959 A1 * | 5/2002 | Kim et al. ...................... 707/3 |
| 2002/0069105 A1 | 6/2002 | do Rosario Botelho et al. |
| 2002/0071423 A1 | 6/2002 | Mirashrafi et al. |
| 2002/0071426 A1 | 6/2002 | Karamchedu et al. |
| 2002/0072974 A1 | 6/2002 | Pugliese et al. |
| 2002/0073207 A1 | 6/2002 | Widger et al. |
| 2002/0087565 A1 * | 7/2002 | Hoekman et al. ........... 707/100 |
| 2002/0090203 A1 | 7/2002 | Mankovitz |
| 2002/0091607 A1 | 7/2002 | Sloan et al. |
| 2002/0094074 A1 | 7/2002 | Lurie |
| 2002/0095331 A1 | 7/2002 | Osman et al. |
| 2002/0107697 A1 | 8/2002 | Jensen |
| 2002/0107805 A1 | 8/2002 | Kamimura et al. |
| 2002/0112005 A1 | 8/2002 | Namias |
| 2002/0116266 A1 | 8/2002 | Marshall |
| 2002/0120554 A1 | 8/2002 | Vega |
| 2002/0122547 A1 | 9/2002 | Hinchey et al. |
| 2002/0128891 A1 | 9/2002 | McSherry |
| 2002/0133388 A1 | 9/2002 | Lauffer |
| 2002/0133402 A1 | 9/2002 | Faber et al. |
| 2002/0133571 A1 | 9/2002 | Jabob et al. |
| 2002/0169836 A1 | 11/2002 | Hood et al. |
| 2002/0173319 A1 | 11/2002 | Fostick |
| 2002/0191762 A1 | 12/2002 | Benson |
| 2002/0193094 A1 | 12/2002 | Lawless et al. |
| 2002/0193135 A1 | 12/2002 | Nakano |
| 2003/0005126 A1 | 1/2003 | Schwartz et al. |
| 2003/0026397 A1 | 2/2003 | McCroskey |
| 2003/0036686 A1 | 2/2003 | Iliff |
| 2003/0041255 A1 | 2/2003 | Chen et al. |
| 2003/0043981 A1 | 3/2003 | Lurie et al. |
| 2003/0046161 A1 | 3/2003 | Kamanger et al. |
| 2003/0046198 A1 * | 3/2003 | Knapp et al. .................. 705/35 |
| 2003/0046361 A1 | 3/2003 | Krisch et al. |
| 2003/0061094 A1 | 3/2003 | Banerjee et al. |
| 2003/0083042 A1 | 5/2003 | Abuhamdeh |
| 2003/0105824 A1 | 6/2003 | Brechner et al. |
| 2003/0112944 A1 | 6/2003 | Brown et al. |
| 2003/0115089 A1 | 6/2003 | Lurie |
| 2003/0126205 A1 | 7/2003 | Lurie |
| 2003/0135095 A1 | 7/2003 | Iliff |
| 2003/0138091 A1 | 7/2003 | Meek et al. |
| 2003/0140084 A1 | 7/2003 | D'Angelo |
| 2003/0153819 A1 | 8/2003 | Iliff |
| 2003/0163299 A1 | 8/2003 | Iliff |
| 2003/0195787 A1 | 10/2003 | Brunk et al. |
| 2003/0212600 A1 | 11/2003 | Hood et al. |
| 2003/0220866 A1 | 11/2003 | Pisaris-Henderson |
| 2003/0223563 A1 | 12/2003 | Wolmuth |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0008834 A1 | 1/2004 | Bookstaff |
| 2004/0010518 A1 | 1/2004 | Montemer |
| 2004/0023644 A1 | 2/2004 | Montemer |
| 2004/0037400 A1 * | 2/2004 | Newkirk ................... 379/88.16 |
| 2004/0038673 A1 | 2/2004 | Dunn et al. |
| 2004/0066927 A1 | 4/2004 | Horvath et al. |
| 2004/0076403 A1 | 4/2004 | Mankovitz |
| 2004/0083133 A1 | 4/2004 | Nicholas et al. |
| 2004/0091093 A1 | 5/2004 | Bookstaff |
| 2004/0096110 A1 * | 5/2004 | Yogeshwar et al. ......... 707/101 |
| 2004/0100497 A1 | 5/2004 | Quillen et al. |
| 2004/0162757 A1 | 8/2004 | Pisaris-Henderson |
| 2004/0174965 A1 | 9/2004 | Brahm et al. |
| 2004/0174974 A1 | 9/2004 | Meek et al. |
| 2004/0193488 A1 | 9/2004 | Khoo et al. |
| 2004/0193740 A1 * | 9/2004 | Kasmirsky et al. .............. 710/1 |
| 2004/0196833 A1 * | 10/2004 | Dahan et al. ................. 370/352 |
| 2004/0199494 A1 * | 10/2004 | Bhatt ............................ 707/3 |
| 2004/0204997 A1 | 10/2004 | Blaser et al. |
| 2004/0234049 A1 | 11/2004 | Melideo |
| 2004/0234064 A1 | 11/2004 | Melideo |
| 2004/0235524 A1 | 11/2004 | Abuhamdeh |
| 2004/0236441 A1 | 11/2004 | Melideo |
| 2004/0247092 A1 | 12/2004 | Timmins et al. |
| 2004/0249649 A1 | 12/2004 | Stratton et al. |
| 2004/0249778 A1 | 12/2004 | Iliff |
| 2004/0252820 A1 | 12/2004 | Faber et al. |
| 2004/0254859 A1 | 12/2004 | Aslanian |
| 2004/0260413 A1 | 12/2004 | Melideo |
| 2005/0010795 A1 | 1/2005 | Tagawa et al. |
| 2005/0018829 A1 | 1/2005 | Baker |
| 2005/0021744 A1 | 1/2005 | Haitsuka et al. |
| 2005/0038686 A1 | 2/2005 | Lauffer |
| 2005/0041647 A1 | 2/2005 | Stinnie |
| 2005/0044238 A1 | 2/2005 | Jacob et al. |
| 2005/0048961 A1 | 3/2005 | Ribaudo et al. |
| 2005/0065811 A1 | 3/2005 | Chu et al. |
| 2005/0071509 A1 | 3/2005 | Faber et al. |
| 2005/0074100 A1 | 4/2005 | Lederman |
| 2005/0074102 A1 | 4/2005 | Altberg et al. |
| 2005/0076100 A1 | 4/2005 | Armstrong |
| 2005/0080878 A1 | 4/2005 | Cunningham et al. |
| 2005/0086104 A1 | 4/2005 | McFadden |
| 2005/0100153 A1 | 5/2005 | Pines et al. |
| 2005/0105881 A1 | 5/2005 | Mankovitz |
| 2005/0114210 A1 | 5/2005 | Faber et al. |
| 2005/0119957 A1 | 6/2005 | Faber et al. |
| 2005/0125416 A1 | 6/2005 | Kirsch et al. |
| 2005/0135387 A1 | 6/2005 | Rychener et al. |
| 2005/0154616 A1 | 7/2005 | Iliff |
| 2005/0165285 A1 | 7/2005 | Iliff |
| 2005/0165666 A1 | 7/2005 | Wong et al. |
| 2005/0203799 A1 | 9/2005 | Faber et al. |
| 2005/0209874 A1 | 9/2005 | Rossini |

| | | | |
|---|---|---|---|
| 2005/0216341 | A1 | 9/2005 | Agarwal et al. |
| 2005/0216345 | A1 | 9/2005 | Altberg et al. |
| 2005/0220289 | A1 | 10/2005 | Reding |
| 2005/0222908 | A1 | 10/2005 | Altberg et al. |
| 2005/0240432 | A1 | 10/2005 | Jensen |
| 2005/0245241 | A1 | 11/2005 | Durand et al. |
| 2005/0251445 | A1 | 11/2005 | Wong et al. |
| 2005/0261964 | A1 | 11/2005 | Fang |
| 2005/0286688 | A1 | 12/2005 | Scherer |
| 2006/0003735 | A1 | 1/2006 | Trandal et al. |
| 2006/0004627 | A1 | 1/2006 | Baluja |
| 2006/0031516 | A1 | 2/2006 | Kumer |
| 2006/0075104 | A1 | 4/2006 | Kumer |
| 2006/0095343 | A1 | 5/2006 | Clarke et al. |
| 2006/0106711 | A1 | 5/2006 | Melideo |
| 2006/0166655 | A1 | 7/2006 | Montemer |
| 2006/0171520 | A1 | 8/2006 | Kliger |
| 2006/0173827 | A1 | 8/2006 | Kliger |
| 2006/0173915 | A1 | 8/2006 | Kliger |
| 2006/0182250 | A1 | 8/2006 | Melideo |
| 2006/0184378 | A1 | 8/2006 | Agarwal et al. |
| 2006/0215826 | A1 | 9/2006 | Lurie et al. |
| 2006/0259365 | A1 | 11/2006 | Agarwal et al. |
| 2007/0070980 | A1* | 3/2007 | Phelps et al. ............... 370/352 |
| 2007/0100799 | A1* | 5/2007 | Rose et al. ................... 707/3 |
| 2007/0280443 | A1 | 12/2007 | Jacob et al. |

FOREIGN PATENT DOCUMENTS

| | | |
|---|---|---|
| EP | 1489529 | 12/2004 |
| GB | 2329046 A | 10/1999 |
| JP | 409233441 A | 9/1997 |
| JP | 409319812 A | 12/1997 |
| JP | 2002007887 | 1/2002 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | 9847295 | 10/1998 |
| WO | 0057326 | 9/2000 |
| WO | 0073960 | 12/2000 |
| WO | 0101217 | 1/2001 |
| WO | 0120518 | 3/2001 |
| WO | 0127825 | 4/2001 |
| WO | 0128141 | 4/2001 |
| WO | 0144973 | 6/2001 |
| WO | 0184415 | 11/2001 |
| WO | 0213110 | 2/2002 |
| WO | 0237470 | 5/2002 |
| WO | 0244870 | 6/2002 |
| WO | 2005109287 | 11/2005 |

OTHER PUBLICATIONS

Sell and buy advice online, The Ottawa Citizen, Nov. 29, 1999.*
Keen.com Plans Web Service Allowing Customers to Hold Private Phone Chats, Don Clark, Wall Street Hournal, Nov. 8, 1999.*
Keen.com raises $60 Millio from Prestigious . . . , Business Wire, Jan. 11, 2000.*
Rose, D. E. and Levinson, D. 2004. Understanding user goals in web search. In Proceedings of the 13th international Conference on World Wide Web (New York, NY, USA, May 17-20, 2004).*
http://www.keen.com/, printed Sep. 27, 2008.*
EXE.com Web Site at www.exp.com/.
The Web Site at www.experts-exchange,com/.
Electronic Emissary at www.tapr.org/emissary/.
The Web Site at www.allexperts.com/.
Michael Kanellos, "Do You Want To Know The Meaning of Life?", Computer Reseller News, March 3, 1997, pp. 72-74.
"Applying Technology News", Accounting Technology, Feb./Mar. 1997, p. 14.
Ellen Greenblatt," Have you ever wondered . . . ", Datamation, Oct. 1997, p. 126.

"Information for sale: Commercial Digital Reference and AskA Services", Virtual Reference Desk, Sep. 20, 1999, at www.vrd.org/AskA/commAskA.html.
Intellect Exchange Web Site (www.intellectexchange.com).
Answers.com Web Page (www.answers.com).
Chris Ott, "Making Good on the Information Economy", Denver Business Journal, Dec. 17, 1999, p. 27.
Michael Rogers et al, "Experts abound at New Web Sites", Library Journal, Mar. 1, 2000, pp. 22-24.
"Surfbrains.com: Brains online save time & money", M2 Presswire, Jul. 11, 2000.
John Healey, "From A-Z, You Can Sell Advice Online", Mercury News retrieved from http://wwwO.mercurycenter.com on Oct. 24, 2001.
Joseph Menn, "An Expert? There's Now a Home for You on the Internet", Los Angeles Times retrieved from http://www.denverpost.com on Oct. 24, 2001.
"Walker Digital Issued Landmark U.S. Patent No. 5,862,223 for Global Internet Marketplace for Experts", Business Wire, Jan. 26, 1999.
Qcircuit Web Site (www.qcircuit.com).
Infomarkets.com Web Site (www.infomarkets.com).
"Expercity.com Launches Premier Online Marketplace for Expert Services", PR Newswire, Aug. 1999.
Information about keen.com retrieved form the Internet [URL:http://www.keen.com], on Oct. 24, 2000.
Cynthia Hodgson, "Online Expert Databases & Services", Econtent, Dec. 1999, p. 48-53.
Jeff Peline, "Net Firm to Connect Users by phone", CNET News.com, retrieved from http://news.cnet.com on Oct. 24, 2001.
"Keen.Com Launches First Live Answer Community", Press release retrieved from http://www.keen.com on Oct. 24, 2000.
"Connecting to On-Line Car Shoppers: Auto Sellers Use Netcall Internet Call-Button Technology to Turn Clicks into Interactive Sales", Business Wire, p. 40489., Jul. 1999.
Davey, Tom, "Wheeling and Dealing Online", PC Week, vol. 13, No. 45, pp. 1, 129., Nov. 1996.
Collett, Stacey & Julie King, "Why Online Browsers Don't Become Buyers", Computerworld, vol. 33, No. 48, p. 14.
Information about Expertcity.com retrieved from the Internet [URL:http://www.expertcity.com] on Apr. 9, 2000.
"Rent-An Expert On the Web", Information Week, p. 75, Sep. 1999.
"USA Global Link Brings Interactively to Internet Shopping", Business Wire., Oct. 1998.
"Lucent Technology and Netscape Team to Deliver Lucent Ecommerce Solutions", Business Wire, Sep. 1998.
"TriNet's, Help Me, I'm Stuck, Internet Voice Button Services Pushes Web Pages to Online Users", Business Wire, Mar. 1998.
Tehrani, Rich, "e-Rip Van Winkle and the 60 second Nap", Call Center Solution, vol. 18, No. 2, pp. 16(3)., Aug. 1999.
"Netcall Internet Call Buttons Enhance E-Commerce Customer Service and Sales", PR Newswire, p. 7431., Aug. 1999.
Linda Littleton, "Meet the Shadowy Future," Proceedings ACM SIGUCCS User Services Conference XXII, Ypsilanti, Michigan Oct. 16-19, 1994, pp. 205-210.
L. F. Ludwig and D.F. Dunn, "Laboratory for Emulation and Study of Integrated and Coordinated Media Communication," Conference on Office Information Systems, Mar. 23-25, 1988, Sponsored by ACM SIGOIS and IEEECS TC-OA in cooperation with IFIP W.G. 8.4, pp. 283-291.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
ISDN Tutorial:Definitions, http://www.ralphb.net/ISDN/defs.html, printed on Apr. 21, 2000.
ISDN Tutorial: Interfaces, http://www.ralphb.net/ISDN/ifaces.html, printed on Apr. 21, 2000.
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.

Masahiko Hase, Shuji Kawakubo and Mineo Shoman, "Advanced Videophone System Using Synchronized Video Filing Equipment," NTT Review, vol. 3, No. 4 Jul. 1991, pp. 29-36.

Franco Mercalli and Roberto Negrini, "The ESSAI Teleshopping System: An Example of a Broadband Multimedia Application," Publication No. 0-7803-1820-X/94, IEEE, 1994, pp. 572-576.

Abhaya Asthana and Paul Krzyzanowski," A Small Domain Communications System for Personalized Shopping Assistance," Proceedings of ICPWC'94, Publication No. 0-7803-1996-6/94, IEEE, 1994, pp. 199-203.

Multimedia Communication in a Medical Environment, IEEE 1991 Singapore I.C. on Networks, 166.

A New Teleconsultation Terminal System Using ISDN, NTT Review, Jul. 1991, 37.

MiniPay: Charging Per Click on the Web, CNISDN, 1997 v29, 939.

Caring for Customers: Real-time text chat and telephony provide personalized customer support and turn queries into sales leads, Internet World Media, Sep. 1999.

When Business Plan and real World Clash, Wall Street Journal, Jun. 9, 1999, B1.

Hidden Cost of Tech Support, PC World, May 1995, 143.

NetBazaar: Networked Electronic Markets for Trading Computation and Information Services, ECDL 1998—Research and Advanced Technology for Digital Libraries, 839.

Multimedia Collaborative Remote Consultation Tools via Gigabit WAN in Teleradiology, IEEE 1994 Phoenix, 417.

Attachment Ready to Answer 'Net questions, Network World, Apr. 8, 1996, 37.

US Courts to Launch First Federal 900 Service, Federal Computer Week, Sep. 28, 1992, 8.

Company Devoted to Hot-Line Support, Computer Reseller News, Oct. 21, 1991, 48,

For Telesphere's Clients, Dial'1-900 Tuf Luck',Business Week, Sep. 9, 1991, 88.

The Voice of Technology, Credit World, pp. 20-23, Jul. 1994.

Telecommunications Buyers Guide and Directory, Editor & Publisher, pp. 29TC-38TC, Feb. 1994.

Aspect Telecomm: Aspect Integrates the Web into the Call Center, M2 Presswire, Aug. 1996.

Information, Bid and Asked, Forbes, Aug. 20, 1990, 92.

*Keen.com, Inc.* v. *InfoRocket.com, Inc.*, Preliminary Injunction Hearing, pp. 286-289 (Jan. 8, 2002).

*Keen.com, Inc.* v. *InfoRocket.com, Inc.*, Complaint For Patent Infringement, Trade Dress Infringement and Unfair Competition; Demand for Jury Trial filed Aug. 31, 2001, pp. 1-8 plus 17 pgs. Of attachments.

European Patent Office, Search Report for European Patent Application No. EP4253389.3, Sep. 17, 2004.

USPTO, Partial Transaction History of U.S. Appl. No. 09/414,710, filed Oct. 8, 1999, entitled "System for Providing Services in Real-Time over the Internet," now abandoned.

USPTO, Partial Transaction History of U.S. Appl. No. 09/488,130, filed Jan. 20, 2000, entitled "Method and Apparatus to Connect Consumer to Expert," now U.S. Patent No. 6,223,165.

USPTO, Partial Transaction History of U.S. Appl. No. 09/733,872, filed Dec. 8, 2000, entitled "Assistance Method and Apparatus," now U.S. Patent No. 6,523,010.

USPTO, Partial Transaction History of U.S. Appl. No. 09/782,925, filed Feb. 13, 2001, entitled "Assistance Method and Apparatus," now U.S. Patent No. 6,549,889.

USPTO, Partial Transaction History of U.S. Appl. No. 09/782,984, filed Feb. 13, 2001, entitled "Assistance Method and Apparatus," now U.S. Patent No. 6,546,372.

USPTO, Partial Transaction History of U.S. Appl. No. 10/107,743, filed Mar. 26, 2002, entitled "Assistance Method and Apparatus," now U.S. Patent No. 6,801,899.

USPTO, Partial Transaction History of U.S. Appl. No. 10/951,502, filed Sep. 27, 2004, entitled "Method and System to Connect Consumers to Information," now U.S. Patent No. 7,249,045.

USPTO, Partial Transaction History of U.S. Appl. No. 11/772,525, filed Jul. 2, 2007, entitled "Method and System to Connect Consumers to Information.".

USPTO, Partial Transaction History of U.S. Appl. No. 09/702,217, filed Oct. 30, 2000, entitled "Apparatus and Method for Specifying and Obtaining Services through Voice Commands," U.S. Patent No. 6,636,590.

USPTO, Partial Transaction History of U.S. Appl. No. 10/644,398, filed Aug. 19, 2003, entitled "Apparatus and Method for Specifying and Obtaining Services through Voice Commands," now abandoned.

USPTO, Partial Transaction History of U.S. Appl. No. 10/956,771, filed Oct. 1, 2004, entitled "Method and System to Connect Consumers to Information Audio Transmission Medium," now U.S. Patent No. 7,224,781.

USPTO, Partial Transaction History of U.S. Appl. No. 11/691,372, filed Mar. 26, 2007, entitled "Method and System to Connect Consumers to Information Audio Transmission Medium.".

Keen.com, "The Most Popular U.S. Question and Answer Marketplace Goes International 90 Days After Launch," PR Newswire, Mar. 13, 2000.

Alexander, Kelly King et al., "1-900 (Pay-For-Information Phone Services)," Baton Rouge Business Report, vol. 9, No. 20, pp. 23-27, Jul. 30, 1991.

Kempner, Matt, "SWM Seeking—the Net Rather than Newspapers," Atlanta Journal the Atlanta Constitution, p. Q1, Sep. 10, 2000.

Turco, Franco, "Legislation is Planned to Hem in 'Scooplines' Covers Revealing Rates, Blocking Service," Arizona Republic, Final Edition, Valley & State Section, p. B8, Jan. 16, 1988.

Sterling, Greg, "Ingenio's Ether—Pay Per Professional Advice," Search Engine Journal, Mar. 3, 2006.

PCT Search Report mailed May 12, 2002 for PCT Application No. US01/48284 (corresponding to U.S. Serial No. 09/702,217).

* cited by examiner

510

550

KEEN™.com
Your Live Answer Community™

You cannot change your Availability on this page   Notify me of incoming calls   [ * | Sign Out ]

| Home | My Account | Keen Mall | My Listings | Help |

View My Listings | Create a Listing | My Homepage | My Customers | Speaker Tips

All Categories > Computing & Internet > Microsoft Office > Microsoft Excel

Create Your Live Answer Listing

Title: [Help with Microsoft Excel]
Choose a title that briefly explains what knowledge you are offering.
50 character maximum, no HTML  SEE TIPS

Description: This is your chance to introduce yourself to the Keen com community, so be thorough and creative (7000 characters maximum (HTML OK)) SEE TIPS > My name is Danielle. I am a graduate student in Economics at the University of Chicago. I can offer help with using Microsoft Excel, especially tackling problems relating to regression analysis, statistical theory, forecasting, and writing macros.

Price Per Minute: [$1.00]
Our suggested per minute fee. You can choose a higher or lower fee, as long as it is at least equal to the basic long distance connection charge-5 cents a minute for the U S and Canada

Your Languages
You can enter as many languages as you'd like. Remember, Keen com members can call you from all around the world - let our community know what languages you speak!

| ☐ Arabic | ☐ Dutch | ☐ French | ☐ Italian | ☐ Mandarin | ☐ Spanish |
| ☐ Cantonese | ☑ English | ☐ German | ☐ Japanese | ☐ Norwegian | ☐ Swedish |
| ☐ Danish | ☐ Finnish | ☐ Hebrew | ☐ Korean | ☐ Portuguese | |

Other Languages: [(none) ▼]

[ OK ]  [ Cancel ]

FIG. 4

APPARATUS AND METHOD FOR SPECIFYING AND OBTAINING SERVICES THROUGH AN AUDIO TRANSMISSION MEDIUM

RELATED APPLICATION

The present patent application is a continuation-in-part of prior application Ser. No. 09/702,217 filed Oct. 30, 2000 now U.S. Pat. No. 6,636,590.

FIELD OF THE INVENTION

The invention relates generally to providing users with service providers in a field of service desired by the user. In particular, the invention relates to a method and apparatus for specifying and obtaining services, via an audio portal, resulting in a live conversation between a user and a selected service provider.

BACKGROUND OF THE INVENTION

Consumers interested in acquiring services must first identify a service provider who is capable of providing the required services. At present, this usually means perusing a telephone directory, which can become frustrating and time-consuming if the service providers telephoned are not immediately available. In addition, a simple telephone call does not enable the service provider to charge a fee according to the time spent with his/her customers.

Systems now exist that enable providers of services to charge fees for the time spent delivering the service. 1-900 phone numbers will charge the seeker of services according to the time spent receiving the service and will transfer this payment, or a portion of it, to the provider.

Each 1-900 number, however, has a very narrow scope—"Hear your Horoscope," for instance. If a seeker would like to hear an entirely different service—"Your Local Weather," for instance—he/she would have to dial a completely different—1-900 number. Similarly, each 1-900 number is quite rigid in the price, quality, and specificity of its service.

However, current systems now exist that enable seekers to locate service providers according to a wide range of price, quality and specificity of service (U.S. application Ser. No. 09/414,710). Such systems also make it possible for the service provider and buyer to be connected and communicate in real time.

Such systems, however, require the service seeker to have a connection to the internet. The service seeker must also have the necessary computer hardware to browse the internet. Presently, there is no system available by which a service seeker can be matched to a wide array of service providers with specific skills using only a simple audio-transmission medium such as the telephone.

Therefore, there remains a need to overcome limitations in the above described existing art which is satisfied by the inventive structure and method described hereinafter.

SUMMARY OF THE INVENTION

The present invention overcomes the problems in the existing art described above by providing a method and apparatus for specifying and obtaining services, via an audio portal, resulting in a live conversation between a user (service seeker) and a selected service provider. The present invention is a system through which seekers of a wide array of services can select, contact, converse, and pay for a service provider using a simple audio-transmission medium such as the telephone. The invention enables the seeker to locate a service provider by speaking the name of a profession, such as "psychiatrist," which is recognized by the system's voice-recognition software. Alternatively, the user can select a service provider category by pressing corresponding keypad(s) of a user telephone.

In a similar fashion, the seeker can then specify the price range, quality rating, language, and keyword descriptors of the service provider using either voice commands or keypad entry. Within the desired parameters, the system offers service providers who have made themselves available to render services at the present time. Once the appropriate available service provider is selected, the system connects the service seeker with the service provider for a live conversation. The system automatically bills the seeker for the time spent conversing with the service provider and compensates the service provider accordingly.

Advantages of the invention include providing users with the capability to engage in a live conversation with a selected service provider via a telephone. Contrary to prior systems, requiring an internet connection and browser to receive such services, the equivalent is now provided by a simple audio transmission medium such as the telephone. As a result, virtually anyone can benefit from the capabilities provided by the present invention. The system also allows providers of a field of service to be compensated for supplying their expertise to a user.

BRIEF DESCRIPTION OF THE DRAWINGS

The present invention is illustrated by way of example, and not by way of limitation, in the figures of the accompanying drawings and in which:

FIG. 4 depicts a web page presented to a service provider desiring inclusion in a service provider database of the present invention;

DETAILED DESCRIPTION

Figure 1:
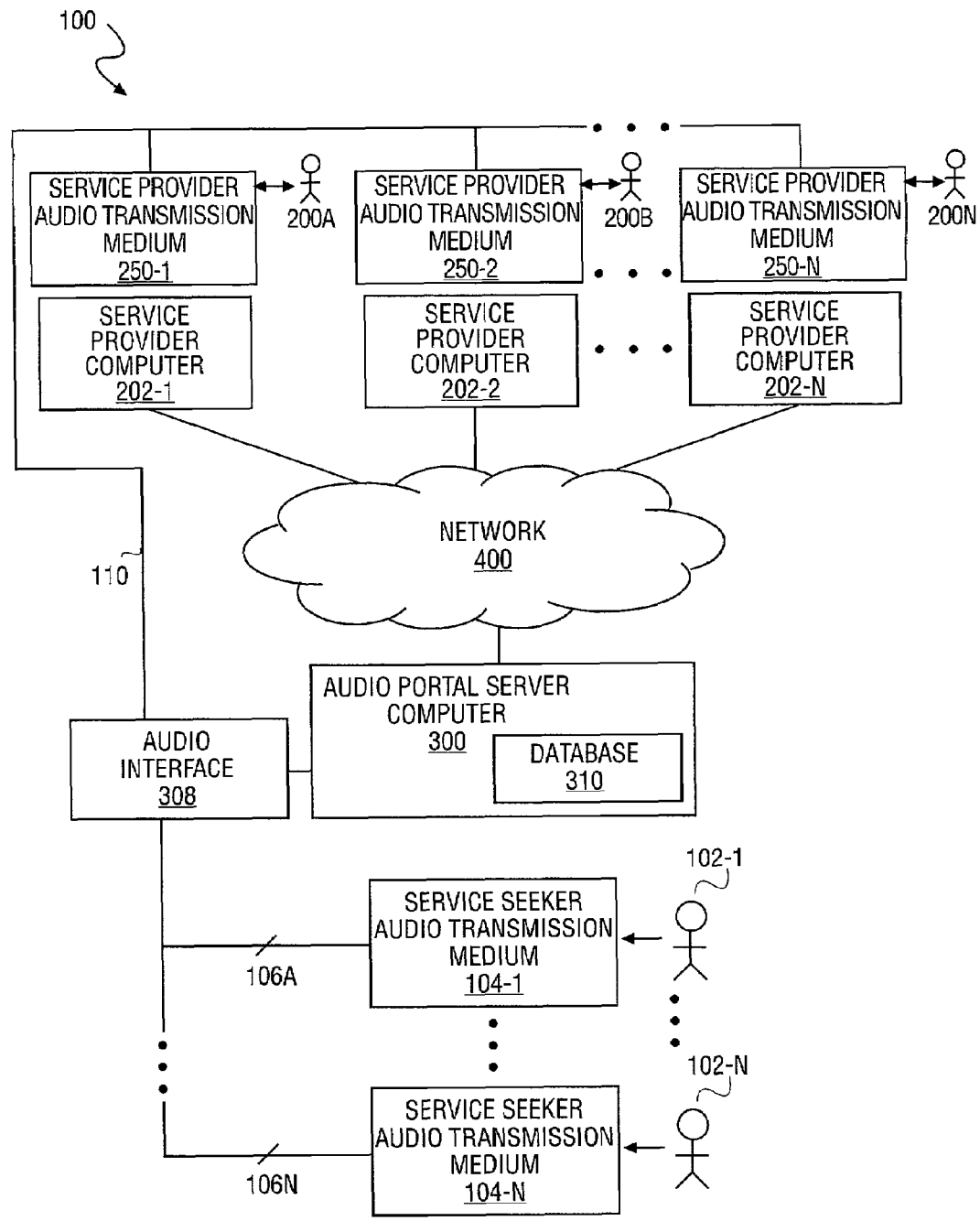
FIG. 1 depicts a block diagram illustrating a system in which an audio portal service provider system in accordance with the present invention may be implemented.

The present invention overcomes the problems in the existing art described above by providing a method and apparatus for specifying and obtaining services through voice commands resulting in a live conversation between a user (service seeker) and a selected service provider. The invention enables the seeker to locate a service provider by speaking the name of a profession, such as "psychiatrist," which is recognized by the system's voice-recognition software. Alternatively, the seeker can select a service provider category by pressing corresponding telephone keypad(s). Once the appropriate available service provider is selected, the system connects the service seeker with the service provider for a live conversation. The system automatically bills the seeker for the time spent conversing with the service provider and compensates the service provider accordingly.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciate that discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting $A+B=C$ as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a propagation medium via a communication link (e.g., a modem, network connection or the like).

System Architecture

FIG. 1 depicts one embodiment of an audio portal service provider system architecture 100 in which the systems and methods of the present invention may be incorporated. One or more service provider computers 200 (200-1, 200-2, ..., 200N) are connected through a network 400 (such as an Intranet, a LAN or a WAN such as the Internet) to a host computer or web server ("audio portal server computer") 300. Persons skilled in the art will recognize that the audio portal server computer 300 may include one or more computers working together to provide the controller computer functions described herein. The audio portal system 100 includes one or more service providers 200 (200-1, ..., 200-N) each having an audio transmission medium 250 (250-1, ... 250-N) that is connected to a communications network 110.

Accordingly, one or more users (service seekers) 102 (102-1, ..., 102-N) access the audio portal system 100 via audio transmission mediums 104 (104-1, ..., 104-N) that are connected to the communications network 110. In accordance with the teachings of the present invention, a service seeker 102 (102-1, ..., 102-N) can send a request 106 (106-1, ..., 106-N) via the audio transmission medium 104, which is received by the audio portal server computer 300 via an audio interface 308. The request may be in the form of either a voice command or keypad entry via an audio transmission medium 104. As described in further detail below, the audio portal server computer 300 can then connect the service seeker 102 to a selected service provider 200 for a live conversation via the audio interface 308.

The communications network 110 generally refers to any type of wire or wireless link enabling the transmission of voice or keypad data such as, but not limited to, a public switched telephone network, a wireless communications network, a local area network, a wide area network or a combination of networks. The audio transmission mediums 104 and 250 generally refer to any type of device capable of receiving speech or keypad entry from a user and providing the speech/keypad entry to a destination via a communications network, such as the communications network 110. In an embodiment of the present invention, the communications network 110 is a public switched telephone network and the audio transmission medium is a telephone.

Figure 2A:
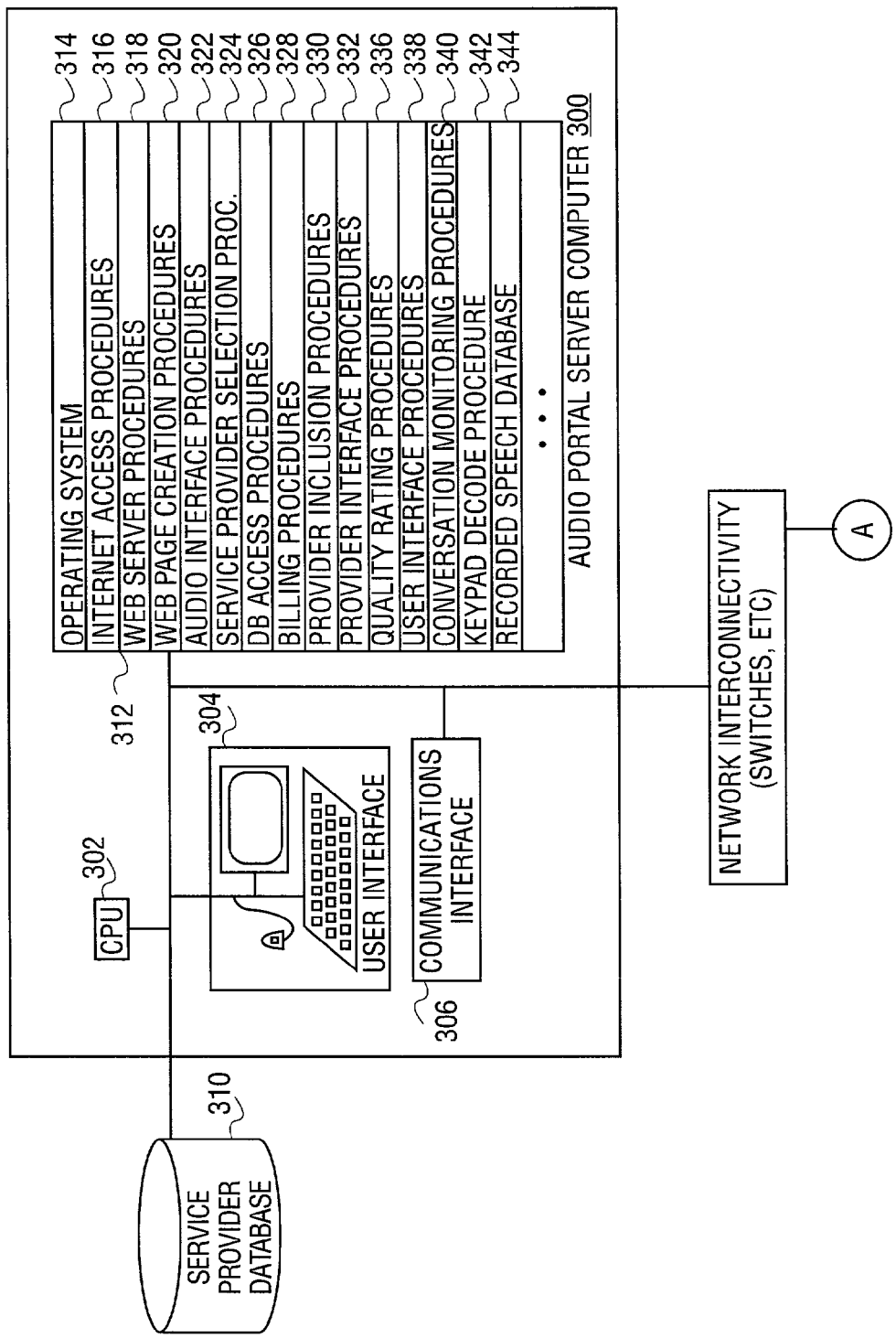
FIGS. 2A and 2B depict block diagrams further illustrating the audio portal service provider system as shown in FIG. 1.

FIG. 2A further illustrates the audio portal service provider system 100, including the audio portal server computer 300, as well as the service provider computer 202. The audio portal server computer 300 includes a central processing unit (CPU) 302, a user interface 304, a communications interface 306, an audio interface 308, a service provider database 310 and a memory 312. The audio portal server computer 300 can be any type of computing device, such as, but not limited to, desktop computers, work stations, lap tops and/or mainframe computers.

The audio interface 308 is used to communicate with users 102 and service providers 200, as well as other system resources not shown. The audio interface 308 receives an audio request 106 provided by user 102 through an audio transmission medium 104, which is provided over the communications network 110. The audio interface 308 provides digitized voice requests to the audio portal server computer 300 for interactive voice recognition, including voice processing, speech recognition and text-to-speech processing. The memory 312 of the audio portal server computer 300 may be implemented as RAM (random access memory), SRAM (synchronous RAM), SDRAM (synchronous data RAM) or a combination of RAM and non-volatile memory, such as one or more memory modules, storage volumes, or magnetic disk storage units. The memory can contain any of the following:

an operating system 314;
internet access procedures 316;
web server procedures 318;
web creation procedures 320;
audio interface procedures 322 for receiving an audio request (voice/keypad entry) 106 from the user 102 via the audio interface 308 and utilizing either integrated voice recognition (IVR) for voice requests or dual tone multi-frequency (DTMF) decoding for keypad entry request to provide the user with a selected service provider and connect the service seeker 102 with the selected service provider 200 for a live conversation;
service provider selection procedures 324 for providing the service seeker 102 with an auditory list of fields of service providers provided by the audio portal system 100, as well as auditory lists of service providers matching a field of service selected by the user 102;
database (DB) access procedures 326 for querying the database 310 in order to return records of service providers matching a field of service selected by the user 102;
billing procedures 328 for billing the service seeker 102 following a live conversation with the service provider 200, as well as compensating the service provider 200 for the live conversation and collecting a premium fee for the audio portal system 100;
provider inclusion procedures 330 for providing an on-line interface, as well as an audio interface (e.g., via telephone), to service providers 200 requesting inclusion in the service provider database 310 in order to provide live services via the audio portal system 100 to perspective users 102;
provider interface procedures 332 for providing both an on-line interface, as well as an audio interface, allowing service providers 200 to update information in the service provider database 310, including times of availability;
quality rating procedures 336 for receiving a quality rating for a service provider 200 following a live conversation with a user 102 based on the user's evaluation of the services provided by the service provider 200;
user interface procedures 338 for providing the service seeker 102 with an audio listing of fields of service available from the audio portal system 100, a keypad value corresponding to each field of service for non-integrated voice recognition embodiments, as well as receiving various descriptors for narrowing the search of service providers, including acceptable price ranges, acceptable quality ratings, specific languages, as well as a service provider ID of a specific service provider when known by the service seeker 102;
conversation monitoring procedures 340 for measuring the duration of the live conversation between the service seeker 102 and the service provider 200;
keypad decoding procedures 342 for decoding service seeker 102 responses entered via keypads of an audio transmission medium 104 (DTMF signals) and converting the requests into a query for selecting either service provider categories or specific service providers from service provider database 310 and providing the selected categories and service providers to the user via user interface procedures 338;
recorded speech database 344 which contains voice listings of the various fields of service available from the service provider system, as well as names of each service provider corresponding to each field of service available from the audio portal system 100, which are provided to the user in order to enable the user to select a service provider to engage in a live, real-time conversation therewith; and other procedures and files.

Figure 2B:
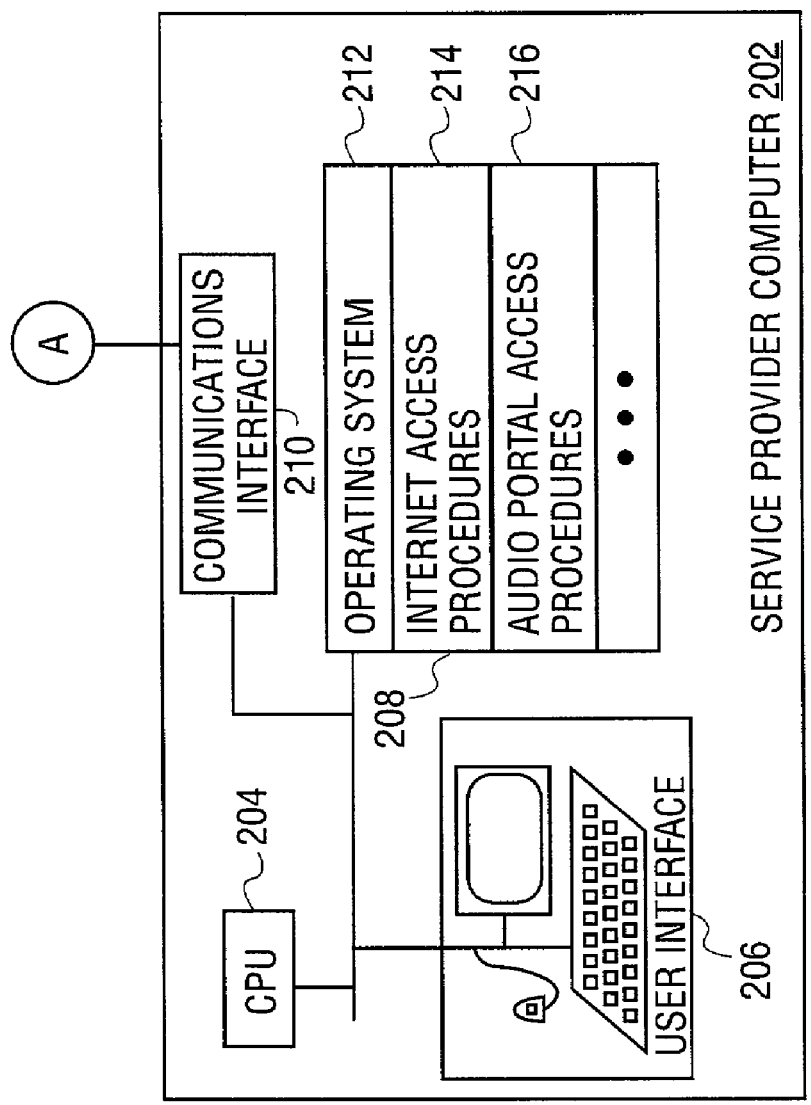

Referring now to FIG. 2B, FIG. 2B illustrates the service provider computer 202, which includes a CPU 204, a user interface 206, a memory 210 and a communications interface 208. The communications interface 208 is used to communicate with the audio portal server computer 300, as well as other system resources not shown. The memory 208 of the service provider computer 202 may be implemented as RAM (random access memory) or a combination of RAM and nonvolatile memory, such as one or more magnetic disk storage units. The memory 208 can contain the following:

an operating system 212;

internet access procedures 214;

audio portal access procedures 216 for accessing the audio portal server computer 300; and as well as other procedures and files.

Figure 3:
FIG. 3 depicts a web page, including a list of fields of service from which service providers can be selected for live conversations in accordance with a further embodiment of the present invention.

The embodiments depicted in FIGS. 2A and 2B include a service provider database 310 containing information about a wide array of service providers 200. In order to present themselves to their potential clients (service seekers), service providers 200 list themselves in this database 310. In one embodiment, this is done through the use of an Internet web site, via web pages 510 and 550, as depicted in FIGS. 3 and 4. The service provider 200 registers his/her name and phone number using the web page 550, along with a description of the service that he/she offers. Possible examples of the wide array of fields of service available from the audio portal system 100 include, but are not limited to, the fields of service depicted in FIG. 3. The description includes key words describing the field of service. The description also includes a price for rendering the service, most commonly, but not restricted to a per-minute price.

The service provider 200 then informs the audio portal system 100 of the times when he/she is available to receive calls. This can be done by creating a schedule of suitable times at the web site 500 or by simply clicking on an "on call"/"off call" switch at the web site 500. Switching service provider 200 availability status can also be done through an audio transmission medium such as a telephone. The service provider 200 calls the central phone number, identifies himself/herself with a password, then presses the telephone keypad "1" or "2", for example, to indicate "on call" or "off call" status, respectively. Once the database 310 contains the phone numbers of service providers, descriptions of their services, their prices, and their real-time availability statuses, the audio portal system 100 can provide services to users 102 desiring corresponding services.

In this embodiment a telephone is used as part of the delivery mechanism or audio transmission medium 250 of the audio portal system 100. A user 102 seeking services (service seekers) dials a central telephone number and then listens to a series of options. In one embodiment, the service seeker is initially prompted for verification information including, for example, a personal information number (PIN) code. Once verified, the service seeker is presented the option to browse available fields of service or enter the extension or identification (ID) code of a desired service provider for automatic connection when the provider is available.

Alternatively, the seeker indicates which type of service he would like to receive by speaking the name of a profession, such as "psychiatrist," which is processed by the system's audio interface 308 using audio interface procedures 322. Otherwise, the user 102 can listen to a series of professions and press the numerical keypad to select one. This process continues until the desired field of service is selected. In addition, when known, the seeker 102 can provide a service provider ID of a desired service provider for immediate connection with the selected service provider (as described above).

Once the user 102 has indicated a field of service using the service provider selection procedures 324, the audio portal system 100 searches its database 310 for service providers in that field using the DB access procedures 326. The user 102 can then further narrow down the selection of service providers by speaking keywords, such as "psychiatry—depression." The user 102 can also indicate a known specific service provider by speaking the service provider's name or punching in the service provider's code number or service provider ID into a telephone keypad for immediate connection.

The service provider selection procedures 324 in conjunction with the user interface procedures 338 allow the user 102 to further narrow the search for a service provider 200 by speaking—or pressing into the telephone keypad—a price, such as "50 cents per minute." The audio portal server computer 300 will then narrow the search in the database 310 for service providers 200 that match the price range. The service seeker 102 can further narrow the search for a service provider 200 by speaking—or pressing into the telephone keypad—a quality rating, such as "three stars or higher." The server computer 300 will then narrow the search in the database 340 for service providers 200 which match the quality rating range. Finally, the user 102 can further narrow the search for a service provider by speaking—or pressing into the telephone keypad—the name of a language, such as "Spanish." The server computer 300 will then narrow the search in the database 310 for service providers 200 who can speak this language.

In addition, the service provider selection procedures 324, in conjunction with the user interface procedures 338, allow the service seeker 102 to select a service provider 200 in response to listings of both the service provider, categories or fields of service available from the system, as well as a specific service provider once a field of service is selected via keypad entry of the user's audio transmission medium 104. Accordingly, the service provider selection procedures 324 and user interface procedures 338 will receive, in one embodiment, dual tone multi-frequency (DTMF) signals generated via the audio transmission medium keypad entry. As such, the user interface procedures 338 will decode the received user selection and convert the decoded DTMF signals into a database query format.

Once converted, the service provider selection procedures 324 will query the service provider database 310 using the user selection in order to provide either service providers within a field of service selected by the user or corresponding service provider selected by the user. Accordingly, in certain embodiments, prior users may enter a service provider code number for immediate connection to the service provider. Accordingly, the seeker can avoid delays provided via interface prompts required by new users in order to familiarize users with the fields of service available from the audio portal system 100. In one embodiment, if the service provider is not available, the seeker is given the option to connect with the highest rated service provider within the corresponding category. As such, the service provider selection procedures 324 and user interface procedures 338 include both IVR software, as well as DTMF decoding software, depending on whether the user's responses are provided as voice responses or keypad entry.

Once a service provider 200 with the desired characteristics has been chosen, the audio portal system 100 will automatically connect the service seeker 102 with the selected service provider 200. Since the service provider 200 has informed the audio portal system 100 that he/she is "on call" and ready to receive calls, the audio portal system 200 can reach him/her with a simple phone call via the audio interface 308. Once both the service seeker 102 and provider 200 are on the phone line 110, the audio portal system 100 conferences the two phone calls together, enabling services to be rendered in a live conversation. The system keeps track of the time spent on the phone call using the conversation monitoring procedures 340. The service seeker 102 is then billed accordingly, and the funds are transferred to the provider 200 using the billing procedures 328.

At the end of the phone call, the system prompts the service seeker 102 to rate the quality of the received service using the quality rating procedures 338. A quality rating of one to five stars, for instance, can be spoken into the telephone 104 or pressed into the telephone keypad. The audio portal system 100 records this rating, and in turn, can store the quality rating in the database 310 and use it as a quality-selection criterion the next time a user 102 calls. Procedural method steps for implementing the teachings of the present invention are now described.

Operation

Figure 5:
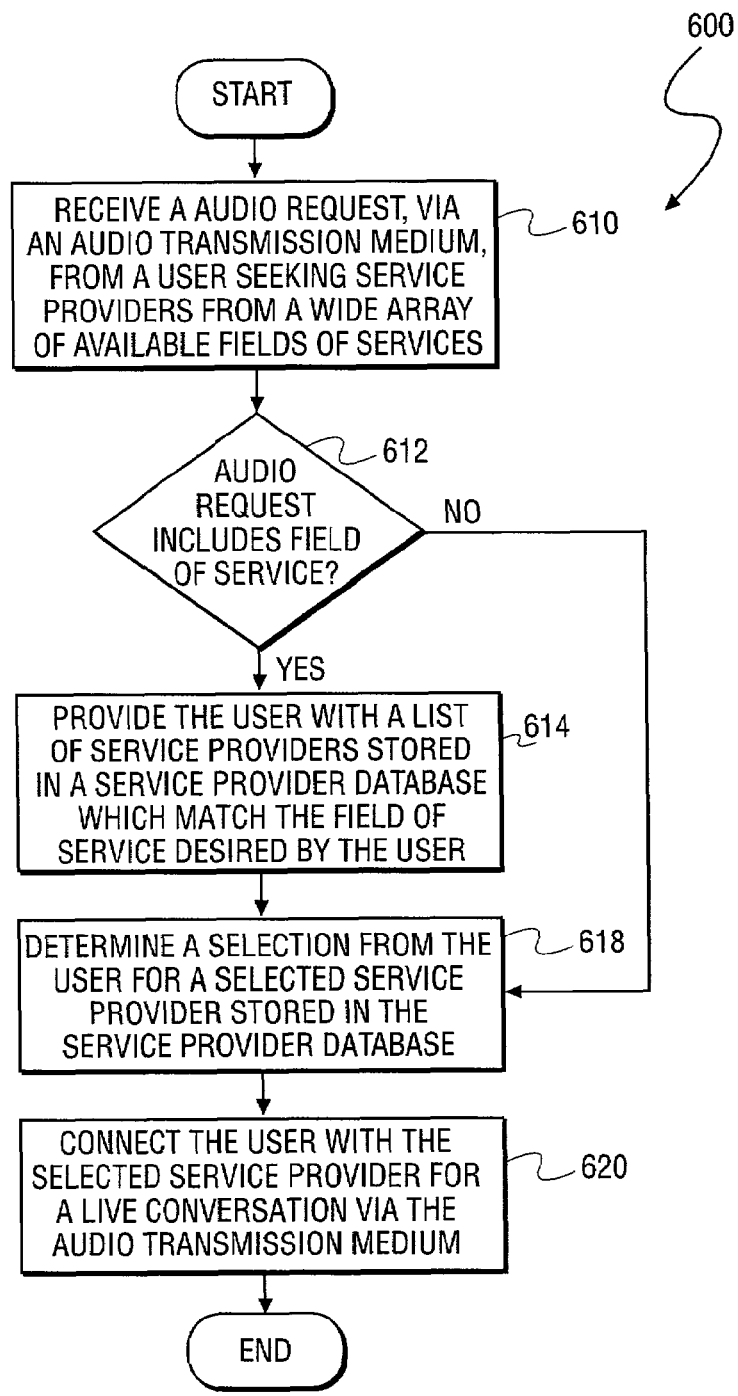
FIG. 5 is a flow chart illustrating a method used to allow a user to select a service provider for a live conversation using the audio portal system in accordance with a further embodiment of the present invention.

Referring now to FIG. 5, a method 600 is depicted for allowing a user 102 to provide an audio request 106 to an audio portal service provider system 100 resulting in a live conversation between a user 102 and a selected service provider 200, for example, in the audio portal system 100 as depicted in FIGS. 1 and 2. At step 610, an audio request 106 is received by the audio portal service provider system 100 from a user 102 (service seeker) that is seeking service providers 200 from a wide array of fields of service available from the audio portal system 100. The audio request 106 is provided via an audio transmission medium 104 and received via an audio interface 308 of an audio portal server computer 300.

Once the request 106 is received, at step 612, it is determined whether the audio request 106 includes a field of service desired by the user 102. At step 614, when the audio request includes a field of service desired by the user 102, the user 102 is provided with a list of one or more service providers 200 stored in a service provider database 310, which match the field of service desired by the user 102. The audio portal server computer 300 selects the list of service providers for the user 102 using the service provider selection procedures 324, as well as the database access procedures 326. The list of service providers is then presented to the user 102 using the user interface procedures 338.

Next, at step 618, the audio portal server computer 300 determines a selection from the service seeker 102 for a selected service provider 200 stored within the service provider database 310. Finally, at step 620, the audio portal server computer 300 uses the audio interface 308 to connect the user 102 with the selected service provider 200 for a live conversation via the audio transmission mediums 104 and 250. The audio interface procedures 322 handle receipt of the audio request 106 and connection of the user 102 with the selected service provider 200. However, the audio interface procedures 322 may be performed by a human operator.

As described above, embodiments of the invention include user response via an audio request, which may include the service provider name, a field of service, or a service provider code for direct connection with the selected service provider. In addition, the user response may be via keypad entry through the user audio transmission medium 104, which generates a DTMF signal, which may also indicate a field of service desired by the user, a corresponding service provider desired by the user, as well as a service provider code for direct connection with the service provider.

As such, depending on the means for user response, the service provider selection procedures 324, in conjunction with the user interface procedures 338, will utilize either IVR software or DTMF decoding software in order to convert the user's response into a query which is recognized by the service provider database. Once the query is generated, the service provider selection procedures will query the service provider database 310 in order to return either the selected field of service, a selected service provider or when service provider code (e.g., extension) is determined to directly connect the service provider with the user when the service provider is available.

Figure 6:
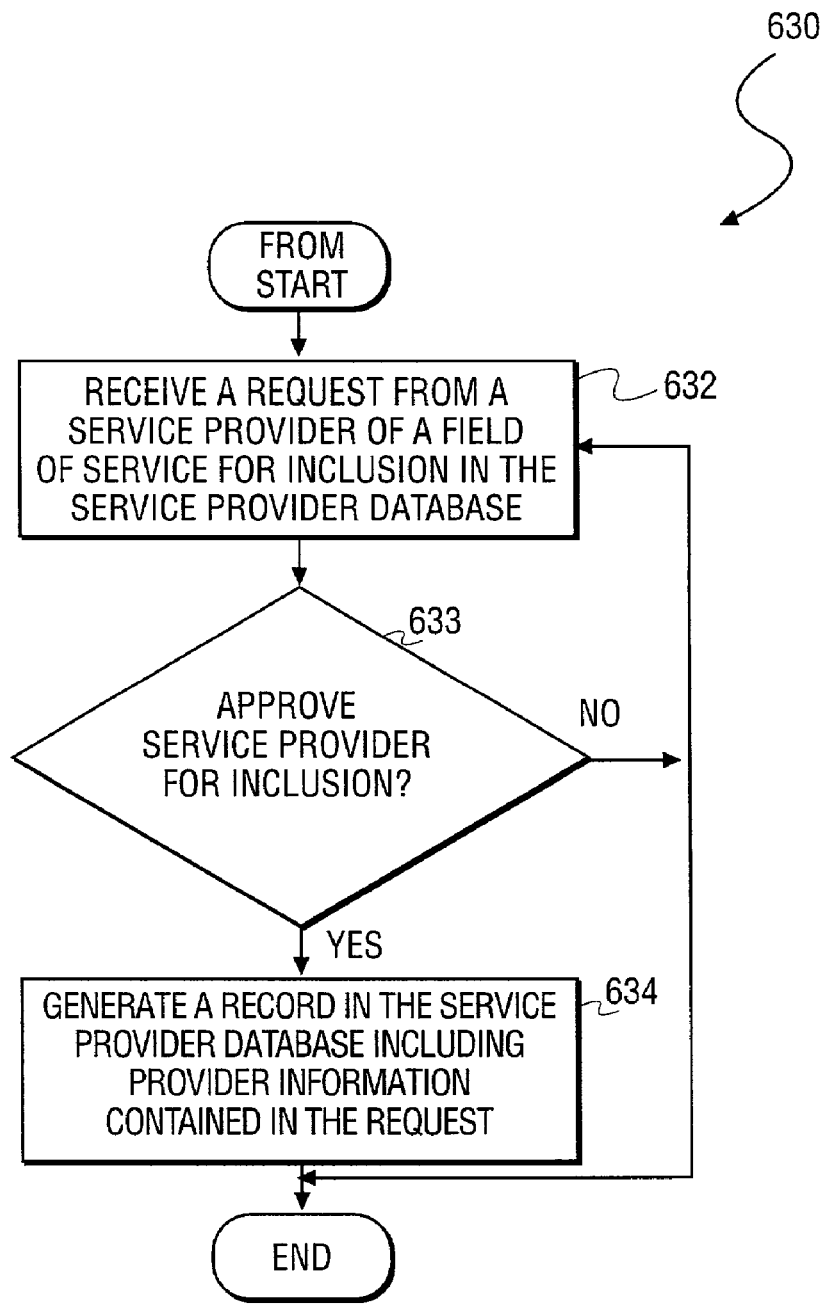
FIG. 6 is a flow chart illustrating an additional method used by a service provider desiring inclusion in the service provider database in accordance with a further embodiment of the present invention.

FIG. 6 depicts additional method steps 630 for adding service providers 200 to the audio portal system 100. At step 632, the audio portal server computer 300 receives a request from a service provider 200 of a field of service requesting inclusion in the service provider database 310. At step 633, the audio portal service provider system 100 determines whether to approve the service provider 200. Approval of a service provider 200 includes, for example, adding an additional field of service to the audio portal system 100 for a new service provider 200.

At step 634, when the service provider 200 is approved, the server computer 300 generates a record in the service provider database 310, including provider information contained in the audio request 106. Acceptance of the provider 200 and generation of provider records in the service provider database 310 is performed by the server computer 300 using provider inclusion procedures 330. The provider information stored in the database 310 can include a service price, real-time service provider availability, specific expertise of the service provider, languages spoken by the provider and a quality rating for the service provider.

Figure 7:
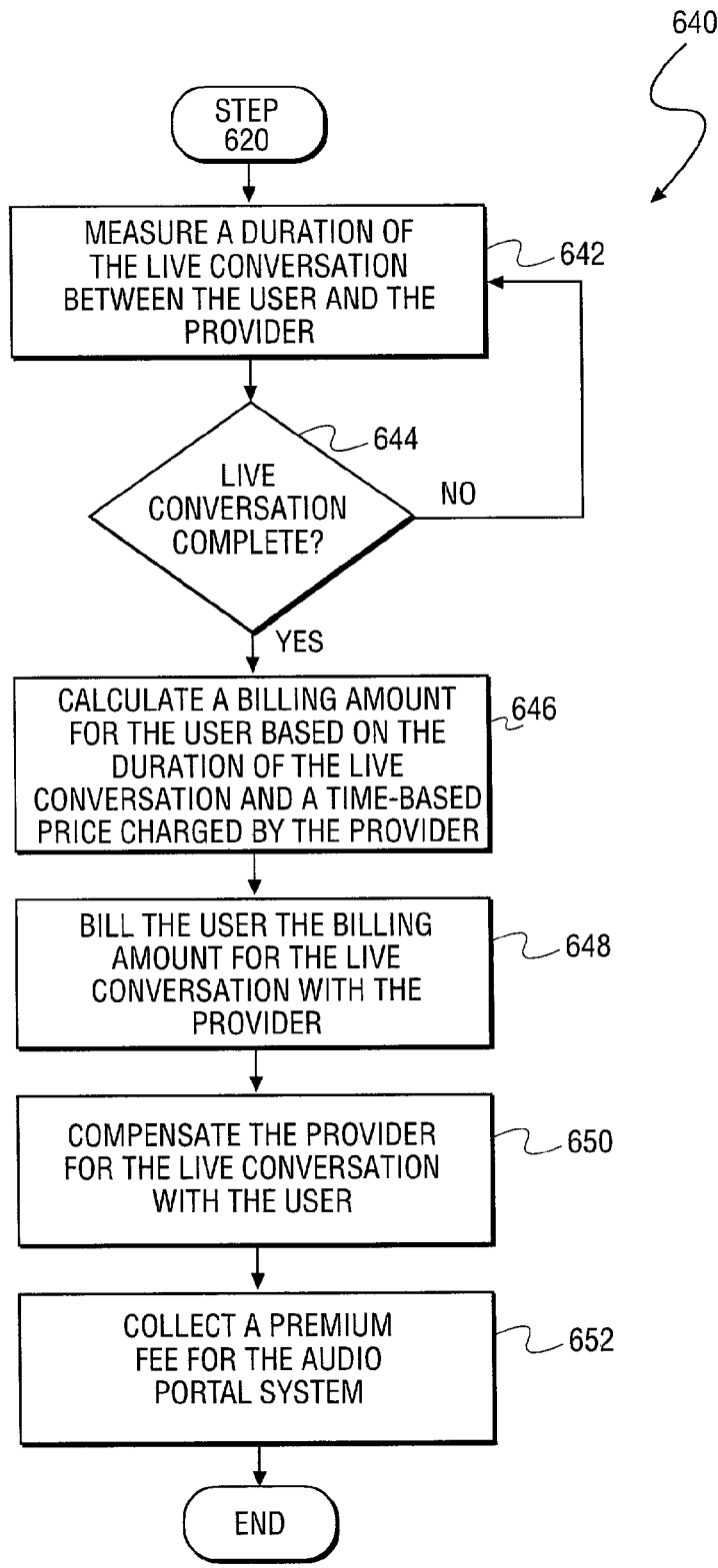
FIG. 7 is a flow chart illustrating an additional method for billing a user and compensating a service provider following a live conversation in accordance with a further embodiment of the present invention.

FIG. 7 depicts additional method step 640 for billing a user 102 and compensating a service provider 200 for a live conversation between the provider 200 and the user 102. At step 642, the server computer 300 measures a duration of the live conversation between the user 102 and the provider 200 using the conversation monitoring procedures 340. Once the live conversation is complete, the server computer 300 calculates a billing amount for the user 102 based on the duration of the live conversation and a time-based price charged by the service provider 200.

In one embodiment, the billing amount is generated by the server computer 300 using the billing procedures 328. However, the billing amount may be a flat fee. Otherwise, the server computer 300 continues measuring the duration of the live conversation between the user 102 and service provider 200 at step 642. The time-based price charged by the service provider 200 includes, for example, a per minute price, hourly price or a flat fee.

At step 648, the server computer 300 bills the service seeker 102 the billing amount for the live conversation with the provider 200. Generally, service seekers 102 of the audio portal service provider system 100 will have a billing account set up with the system 100. The audio portal system 100 can then either deduct from the user's account or charge the billing amount, for example, to a credit card submitted by the service seeker 102. At step 650, the audio portal service provider system 100 compensates the provider 200 for the live conversation with the service seeker 102. Finally, at step 652, the server computer 300 collects a premium fee for the audio portal system 100 as a predetermined percentage of the billing amount, for example, ten percent.

Figure 8:
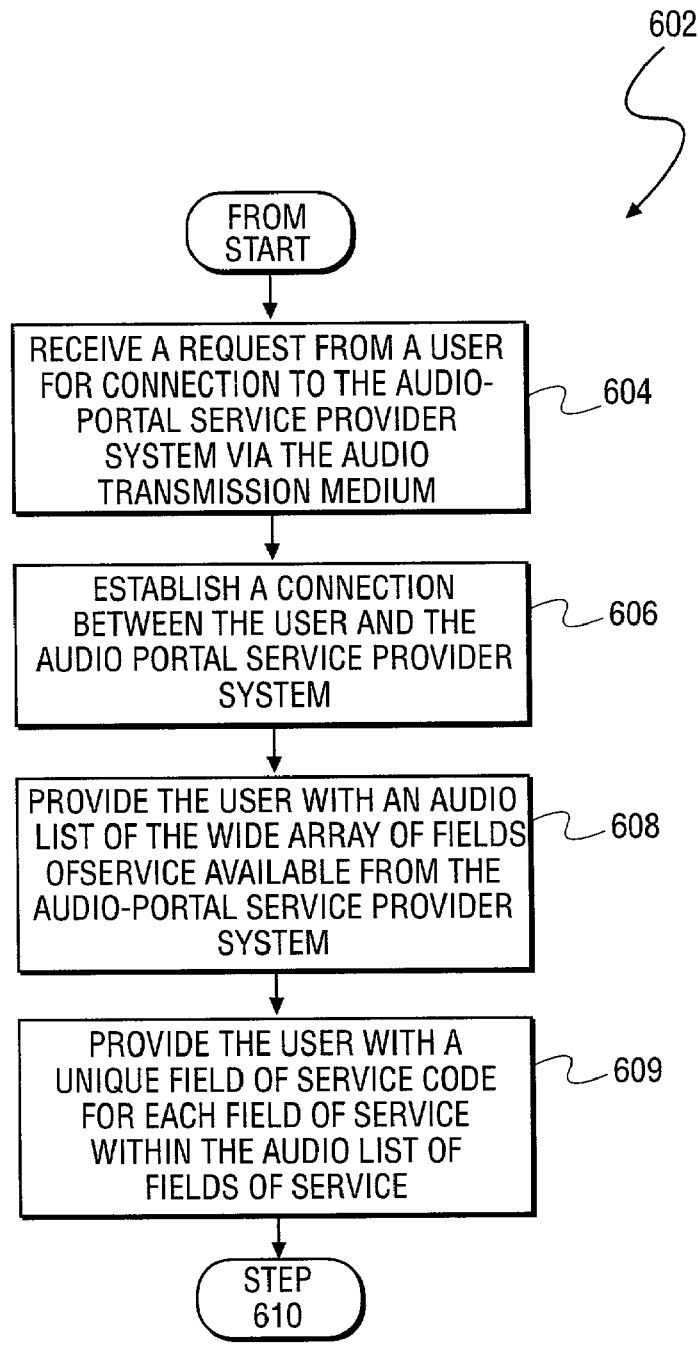
FIG. 8 is a flow chart illustrating an additional method for connecting a user desiring a service provider to the audio portal service provider system in accordance with an exemplary embodiment of the present invention.

FIG. 8 depicts additional method step 602 for connecting a service seeker 102 to the audio portal service provider system 100. At step 604, the server computer 300 receives a request from a user 102 for connection to the audio portal service provider system 100 via the audio transmission medium 104. The audio transmission medium 104 is, for example, a telephone. At step 606, the server computer 300 establishes a connection between the service seeker 102 and the audio portal system 100 via the audio interface 308. At step 608, the server computer 300 provides the user 102 with an audio list of the wide array of fields of service available from the audio portal service provider system 100 using the user interface procedures 338.

Finally, at step 609, the system 100 will provide the service seeker, via the user interface procedures 338, a unique field of service code for each field of service within the audio list of fields of service provided to the service seeker 102. Accordingly, the service seeker can select a desired field of service and enter a field of service code corresponding to the desired field of service within the keys of the service seeker's audio transmission medium 104. Once entered, the audio transmission medium 104 will generate a DTMF response, which is interpreted by the user interface procedures 338 in order to select service providers within the field of service desired by the user.

Figure 9:
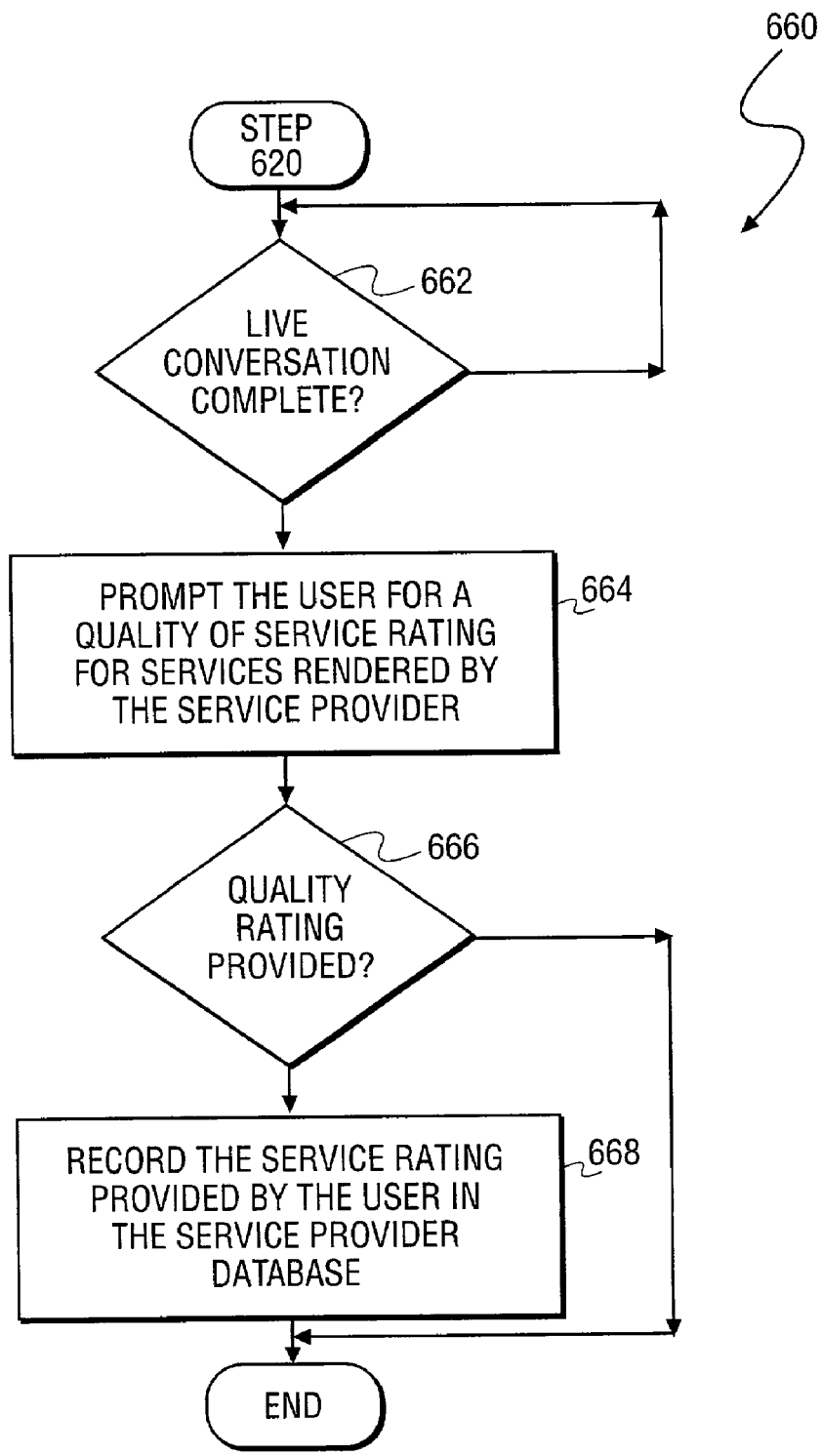
FIG. 9 depicts a flowchart illustrating an additional method for receiving a quality rating from a user regarding services provided by a service provider in accordance with an exemplary embodiment of the present invention.

FIG. 9 depicts additional method step 660 for receiving a quality rating from a user 102 regarding the live conversation with the service provider 200. At step 662, it is determined whether the live conversation is complete. At step 664, the server computer 300 prompts the user 102 for a quality of service rating for services rendered by the service provider 200. At step 666, it is determined whether a quality rating is provided by the user 102. At step 668, the server computer 300 records the service rating provided by the user 102 in the service provider database 310.

As described above, the audio request 106 provided by the user 102 can include the category of service providers, a maximum price range for service providers, desired times of availability for service providers, specific expertise of the service provider, a language spoken by the service provider and a minimum quality rating for the service provider. These criteria are used by the server computer 300 and provided to service provider selection procedures 324 in order to narrow the list of service providers 200 for the user 102 to choose from.

APPLICATION OF THE INVENTION

Danielle, a graduate student in economics, happens to be an expert user of Microsoft Excel. To earn extra money while writing her thesis, Danielle decides to post her Excel-help service son the subject web site, an Internet based implementation of the invention. She registers at the site and lists herself under "Computer Help" and "Excel" at the rate of $1.00 per minute. During the registration process, Danielle provides her telephone number and a description of her abilities, which include regression models and statistical analysis. Whenever Danielle is at home alone studying for long stretches in the evening, she signs on to the subject web site and changes her state of availability to "On Call," or immediately available to receive clients.

Michael is a management consultant building a regression model on Excel for a large clothing retailer. At midnight in the office, he is having trouble analyzing his spreadsheet. Looking to receive help, he dials the 1-800 number of the subject system. He is prompted by the system to indicate the area of service he desires. He speaks the words, "Computer Help," which are recognized by the system's voice-recognition software. The system has several thousand computer-help service providers to choose from, so Michael specifies his needs by speaking the words, "regression models and analysis."

The system has about 50 service providers who are "On Call" to receive customers regarding regression models and analysis. Michael then indicates the price and quality he desires by speaking the words, "one dollar per minute or less" and "with a three-star quality rating or above." The system uses these parameters to fine only those service providers who fit within this price and quality range and can presently receive customers regarding regression models and analysis—there are four. The system relays the descriptions of the four service providers to Michael. He selects Danielle by speaking the words, "Connect Me."

Since Michael has not used the subject phone system before, he first must enter his credit card number to pay for the call. Once the credit card number has been confirmed, the system dials Danielle's phone number, which it has on file from her registration at the web site. When Danielle picks up the phone, the automated voice of the system informs her that there is a client on the line looking for "Computer Help" and willing to pay her $1.00 price per minute. The system asks her whether she would like to accept the call. She speaks the word "yes" (or presses "1" on her telephone keypad), and the system conferences the separate phone calls to Danielle and Michael together so that they can communicate.

Michael and Daniel talk until his problem is solved, which takes eight minutes. Michael's credit card is billed for eight dollars. He receives a confirming message via electronic mail notifying him of this, along with a request to evaluate Danielle's service, which he does, pressing "5" on his telephone keypad to award her five stars, which the system then averages into her overall quality rating. Danielle's web site account is credited for eight dollars minus a fee collected by the web site. Once Danielle's web site account has accumulated a surplus of $25, she receives a check from the web site in the mail. After receiving many positive reviews from online clients such as Michael, Danielle is inundated with Excel-help requests whenever she goes "On Call," enabling her to raise her rates to $1.50 per minute.

The scenario described above illustrates a situation where Michael is allowed to enter a voice request for selection of a service provider and to further narrow the categories. However, certain implementations of the present invention will provide service seekers, such as Michael, with a listing of fields of service provided by the system and indicate a field of service code corresponding to each field of service available from the system. As such, a user such as Michael, would select the desired field of service and enter a field of service code corresponding to the desired field of service via the keypad of Michael's telephone in order to provide a list of service providers in the area of computer health. Therefore, service seekers such as Michael are provided the option to enter voice responses or keypad entry responses in order to enable final selection of a service provider and enter into a live conversation with the desired service provider in order to solve the service seeker's problem.

Alternate Embodiments

Several aspects of one implementation of the audio portal system for providing a real-time communications connection between a service seeker and a service provider have been described. However, various implementations of the audio portal system provide numerous features including, complementing, supplementing, and/or replacing the features described above. Features can be implemented as part of the audio portal system or as part of an on-line implementation in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to an audio portal, it will be appreciated by those skilled in the art that the teaching of the present invention can be applied to other systems. In fact, systems for connection of service seekers and service providers for real-time communication are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

Advantages of the invention include providing users with the capability to engage in a live conversation with a selected service provider via a telephone. Contrary to prior systems requiring an internet connection and browser to receive such services, the equivalent is now provided by a simple audio transmission medium such as the telephone. As a result, virtually anyone can benefit from the capabilities provided by the present invention. The system also allows providers of a field of service to be compensated for supplying their expertise to a user.

Having disclosed exemplary embodiments, modifications and variations may be made to the disclosed embodiments while remaining within the scope of the invention as defined by the following claims.

What is claimed is:

1. A method comprising:
receiving from a user at least one search criterion via an audio connection, the at least one search criterion including a threshold for a quality of service rating;
presenting during the audio connection, a list of a plurality of service providers in an audio form to the user according to the at least one search criterion;
determining a selection of the user for a selected service provider from the list;
during the audio connection, connecting the user with the selected service provider for a live conversation via the audio connection;
detecting a completion of the live conversation between the user and the selected service provider; and
while the user remains connected to the audio connection, prompting the user for the quality of service rating for services rendered by the selected service provider in response to a detected completion of the live conversation.

2. The method of claim 1, further comprising:
converting the at least one search criterion from an audio form into a database query to search the list of service providers, comprising:
responsive to a voice entry of the at least one search criterion, converting the voice entry into the database query utilizing interactive voice recognition software; and
responsive to a keypad entry of the at least one search criterion, converting a signal generated by the keypad entry into the database query utilizing a Dual Tone Multi-Frequency (DTMF) decoder.

3. The method of claim 1, further comprising:
receiving a request from the selected service provider for inclusion in a service provider database; and
when the selected service provider is approved for inclusion in the service provider database, generating a record in the service provider database, the record including provider information contained in the request, wherein the provider information includes a field of service, at least one of specific expertise of the selected service provider, and at least one language spoken by the selected service provider.

4. The method of claim 1, further comprising:
billing the user for the live conversation with the selected service provider; and
compensating the selected service provider for the live conversation with the user.

5. The method of claim 4, wherein the billing the user further comprises:
measuring a duration of the live conversation between the user and the selected service provider; and
calculating a billing amount for the user based on the duration of the live conversation and a time-based price charged by the selected service provider.

6. The method of claim 4, wherein the billing the user further comprises:
calculating a billing amount for the user based on a flat fee charged by the service provider.

7. The method of claim 1, wherein the at least one search criterion is received as one of a voice request and a keypad entry response; and the at least one search criterion includes at least one of: a category of service providers, a service provider price, service provider availability, service provider specific expertise, service provider language and a service provider minimum quality rating.

8. The method of claim 1, further comprising:
providing the user with an audio list of an array of fields of service available from an audio portal service provider system; and
providing the user with a unique audio field of service code corresponding to each field of service within the audio list of fields of service, wherein an keypad entry of a field of service code is received via the audio connection to select a desired field of service for the at least one search criterion.

9. The method of claim 1, further comprising:
recording the service rating provided by the user in a service provider database.

10. The method of claim 1, wherein determining the selection of the user further comprises:
when the selection of the user includes a voice request, converting the voice request into a database query language format using integrated voice recognition software to determine the service provider selected by the user;

when the selection of the user includes a keypad entry response, converting a signal generated by the keypad entry response into a database query language format to determine the service provider selected by the user; and querying a service provider database according to a query generated according to the selection to select the service provider desired by the user.

11. A computer readable storage medium including program instructions contained on a computer readable memory to direct a computer to perform a method, when the instructions are executed by a processor, the method comprising:

receiving from a user at least one search criterion via an audio connection, the at least one search criterion including a threshold for a quality of service rating;

presenting during the audio connection a list of a plurality of service providers in an audio form to the user according to the at least one search criterion;

determining a selection of the user for a selected service provider from the list;

during the audio connection, connecting the user with the selected service provider for a live conversation via the audio connection;

detecting a completion of the live conversation between the user and the selected service provider; and while the user remains connected to the audio connection, prompting the user for the quality of service rating for services rendered by the selected service provider in response to a detected completion of the live conversation.

12. The computer readable storage medium of claim 11, wherein the method further comprises:

converting the at least one search criterion from the audio form into a database query to search the list of service providers, comprising:

responsive to a voice entry of the at least one search criterion, converting the voice entry into the database query utilizing interactive voice recognition software; and responsive to a keypad entry of the at least one search criterion, converting a signal generated by the keypad entry into the database query utilizing a Dual Tone Multi-Frequency (DTMF) decoder.

13. The computer readable storage medium of claim 11, wherein the method further comprises:

receiving a request from the selected service provider for inclusion in a service provider database; and when the selected service provider is approved for inclusion in the service provider database, generating a record in the service provider database, the record including provider information contained in the request, wherein the provider information includes specific expertise of the selected service provider, and at least one language spoken by the selected service provider.

14. The computer readable storage medium of claim 11, wherein the method further comprises:

billing the user for the live conversation with the selected provider; and compensating the selected service provider for the live conversation with the user.

15. The computer readable storage medium of claim 14, wherein said billing the user further comprises:

measuring a duration of the live conversation between the user and the provider; and calculating a billing amount for the user based on the duration of the live conversation and a time-based price charge by the provider.

16. The computer readable storage medium of claim 14, wherein said billing the user further comprises:

calculating a billing amount for the user based on a flat fee price charge by the provider.

17. The computer readable storage medium of claim 11, wherein the at least one search criterion is received as one of a voice request and a keypad entry response; and the at least one search criterion includes at least one of: a category of service providers, a service provider price, service provider availability, service provider specific expertise, service provider language and a service provider minimum quality rating.

18. The computer readable storage medium of claim 11, wherein the method further comprises:

providing the user with an audio list of an array of fields of service available from the audio portal service provider system; and providing the user with a unique audio field of service code corresponding to each field of service within the audio list of fields of service, wherein a keypad entry of a field of service code is received via the audio connection to select a desired field of service for the at least one search criterion.

19. The computer readable storage medium of claim 11, wherein the method further comprises:

recording the service rating provided by the user in the service provider database.

20. The computer readable storage medium of claim 11, wherein said determining the selection of the user further comprises:

when the selection of the user includes a voice request, converting the voice request into a database query language format using integrated voice recognition software to determine the service provider selected by the user;

when the selection of the user includes a keypad entry response, converting a DTMF signal generated by the keypad entry response into a database query language format in order to determine the service provider selected by the user; and querying a service provider database according to a query generated according to the selection to select the service provider desired by the user.

21. An audio portal service provider system comprising:
an interface to an audio connection;
an audio recognition engine coupled to the interface to receive at least one search criterion in an audio form from a user via the audio connection, the at least one search criterion including a threshold of a quality of service rating; and
a processor coupled to the audio recognition engine and the interface, the processor to search a service provider database according to the at least one search criterion to generate a list of a plurality of service providers for presentation to the user during the audio connection, the processor to further determine a selection of the user for a selected provider from the list via the audio recognition engine, the processor to cause the interface to connect the user with the selected service provider for a live conversation during the audio connection, the processor to detect a completion of the live conversation between the user and the selected service provider and, while the user remains connected to the audio connection, the processor to prompt the user for the quality of service rating for services rendered by the selected service provider in response to a detected completion of the live conversation.

22. The system of claim 21, further wherein:

the interface is coupled to the processor to provide the user with an audio list of available fields of service providers, accept a field of service desired by the user, provide the user with the list of service providers which match the at least one search criterion and a field of service desired by the user, and receive a selection from the user for the selected service provider.

23. The system of claim 21, further comprising:

a network interface coupled to the processor to receive a request from the selected service provider of a field of service for inclusion in the service provider database, and the processor to generate a record for storage in the service provider database, the record including provider information contained in the request.

24. The system of claim 23, wherein the provider information includes specific expertise of the service provider, and at least one language spoken by the service provider.

25. The system of claim 21, wherein the interface comprises:

a telephone network interface;

wherein the processor searches the service provider database to generate the list of service providers based at least partially on information indicating availability for service providers to conduct live conversation.

26. The system of claim 21, wherein the interface comprises:

a wireless communications network interface.

* * * * *